United States Patent [19]

Masuda

[11] Patent Number: 4,755,996
[45] Date of Patent: Jul. 5, 1988

[54] IMAGE FORMING SYSTEM

[75] Inventor: Shunichi Masuda, Tokyo, Japan

[73] Assignee: Canon Kabushiki Kaisha, Tokyo, Japan

[21] Appl. No.: 897,540

[22] Filed: Aug. 18, 1986

Related U.S. Application Data

[63] Continuation of Ser. No. 525,781, Aug. 10, 1983, abandoned.

[30] Foreign Application Priority Data

| Aug. 26, 1982 | [JP] | Japan | 57-148170 |
| Aug. 26, 1982 | [JP] | Japan | 57-148171 |
| Aug. 26, 1982 | [JP] | Japan | 57-149638 |
| Aug. 26, 1982 | [JP] | Japan | 57-154119 |
| Aug. 26, 1982 | [JP] | Japan | 57-154120 |
| Aug. 26, 1982 | [JP] | Japan | 57-154121 |

[51] Int. Cl.$^4$ .......................... G06F 11/00
[52] U.S. Cl. .................. 371/16; 355/14 C; 364/200
[58] Field of Search ............. 371/16, 20; 364/131, 364/184, 518, 200, 900; 355/14 C, 14 R

[56] References Cited

U.S. PATENT DOCUMENTS

| 4,062,061 | 12/1977 | Batchelor et al. | 364/900 |
| 4,158,886 | 6/1979 | Gray, Jr. et al. | 364/518 |
| 4,306,803 | 12/1981 | Donohue et al. | 355/14 C |
| 4,314,754 | 2/1982 | Shimizu et al. | 355/14 C |
| 4,443,849 | 4/1984 | Ohwada | 364/200 |
| 4,477,178 | 10/1984 | Furuichi et al. | 355/14 R |
| 4,521,847 | 6/1985 | Ziehm et al. | 371/12 X |
| 4,556,310 | 12/1985 | Masuda | 355/14 R |
| 4,586,179 | 4/1986 | Sirazi et al. | 371/12 |

Primary Examiner—Charles E. Atkinson
Attorney, Agent, or Firm—Fitzpatrick, Cella, Harper & Scinto

[57] ABSTRACT

An image forming system has a copy apparatus with an ADF, a sorter and the like, two or more micro computers, and reset circuits. When a micro computer detects an abnormality in data transferred between micro computers, its reset circuit resets the system such that a predetermined copy process is performed and then the system safely stops. Such an abnormality in the transfer data can be detected by short bars connected to interfaces of the micro computers.

29 Claims, 28 Drawing Sheets

FIG. 6

ST0 — MICROCOMPUTER (B)

| ST0 3 | ST0 2 | ST0 1 | ST0 0 | DATA | CONTENTS |
|---|---|---|---|---|---|
| 0 | 0 | 0 | 0 | 0 | DURING COPY STOP |
| 1 | 0 | 0 | 0 | 8 | COPY CYCLE |
| 1 | 0 | 0 | 1 | 9 | COPY COUNT |
| 1 | 0 | 1 | 0 | 10 | COPY LAST ROTATION |
| 1 | 0 | 1 | 1 | 11 | UPON COPY STOP |

ST1

| ST1 3 | ST1 2 | ST1 1 | ST1 0 | DATA | CONTENTS |
|---|---|---|---|---|---|
| 0 | 0 | 0 | 0 | 0 | NORMAL |
| 0 | 0 | 0 | 1 | 1 | SEET FEED OUTLET JAM |
| 0 | 0 | 1 | 0 | 2 | SLANT FEED DELAY JAM |
| 0 | 0 | 1 | 1 | 3 | SLANT FEED HITCH JAM |
| 0 | 1 | 0 | 0 | 4 | COPY DISCHARGE DELAY JAM |
| 0 | 1 | 0 | 1 | 5 | COPY DISCHARGE HITCH JAM |
| 1 | 1 | 1 | 1 | 15 | JAM KILLER |

ST2

| ST2 3 | ST2 2 | ST2 1 | ST2 0 | DATA | CONTENTS |
|---|---|---|---|---|---|
| 0 | 0 | 0 | 0 | 0 | RESET BY SERVICEMAN |
| 0 | 0 | 0 | 1 | 1 | OVER ALL EXPOSURE |
| 0 | 0 | 1 | 0 | 2 | INITIAL EXPOSURE |
| 0 | 0 | 1 | 1 | 3 | DRUM CLOCK |
| 0 | 1 | 0 | 0 | 4 | HV TRANSFORMER |
| 0 | 1 | 0 | 1 | 5 | FAN MOTOR |
| 0 | 1 | 1 | 0 | 6 | EXPOSURE LAMP |

ST3 — MICROCOMPUTER (A)

| ST3 3 | ST3 2 | ST3 1 | ST3 0 | DATA | CONTENTS |
|---|---|---|---|---|---|
| 1 | 0 | 0 | 0 | 8 | BOOK MODE |
| 1 | 0 | 0 | 1 | 9 | SHEET MODE |
| 1 | 0 | 1 | 0 | 10 | REDUCTION (R1) |
| 1 | 0 | 1 | 1 | 11 | REDUCTION (R2) |
| 1 | 1 | 1 | 1 | 15 | DIAGNOSIS |

| FIG. | 9A |
|---|---|
| FIG. | 9B |
| FIG. | 9C |

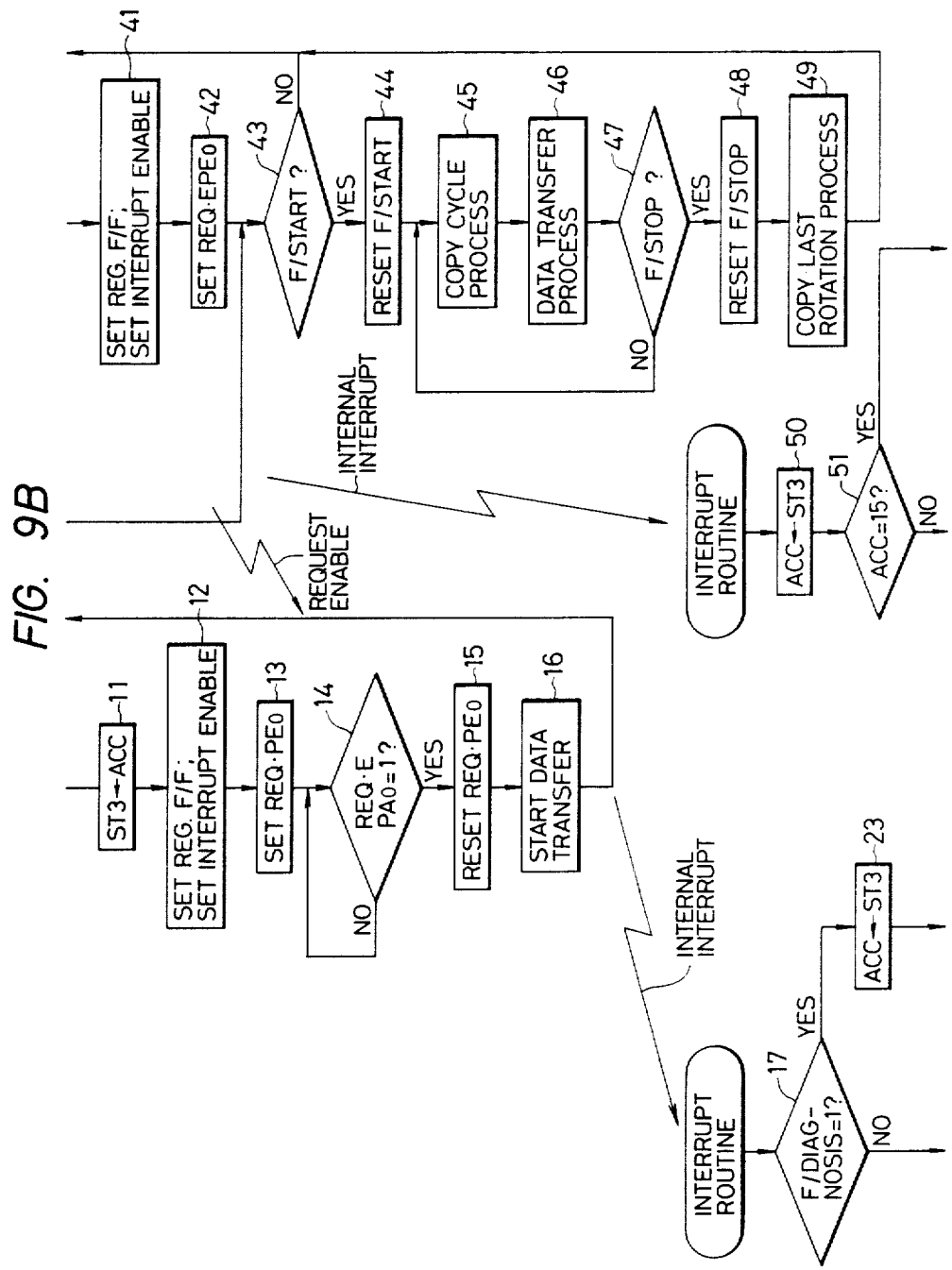

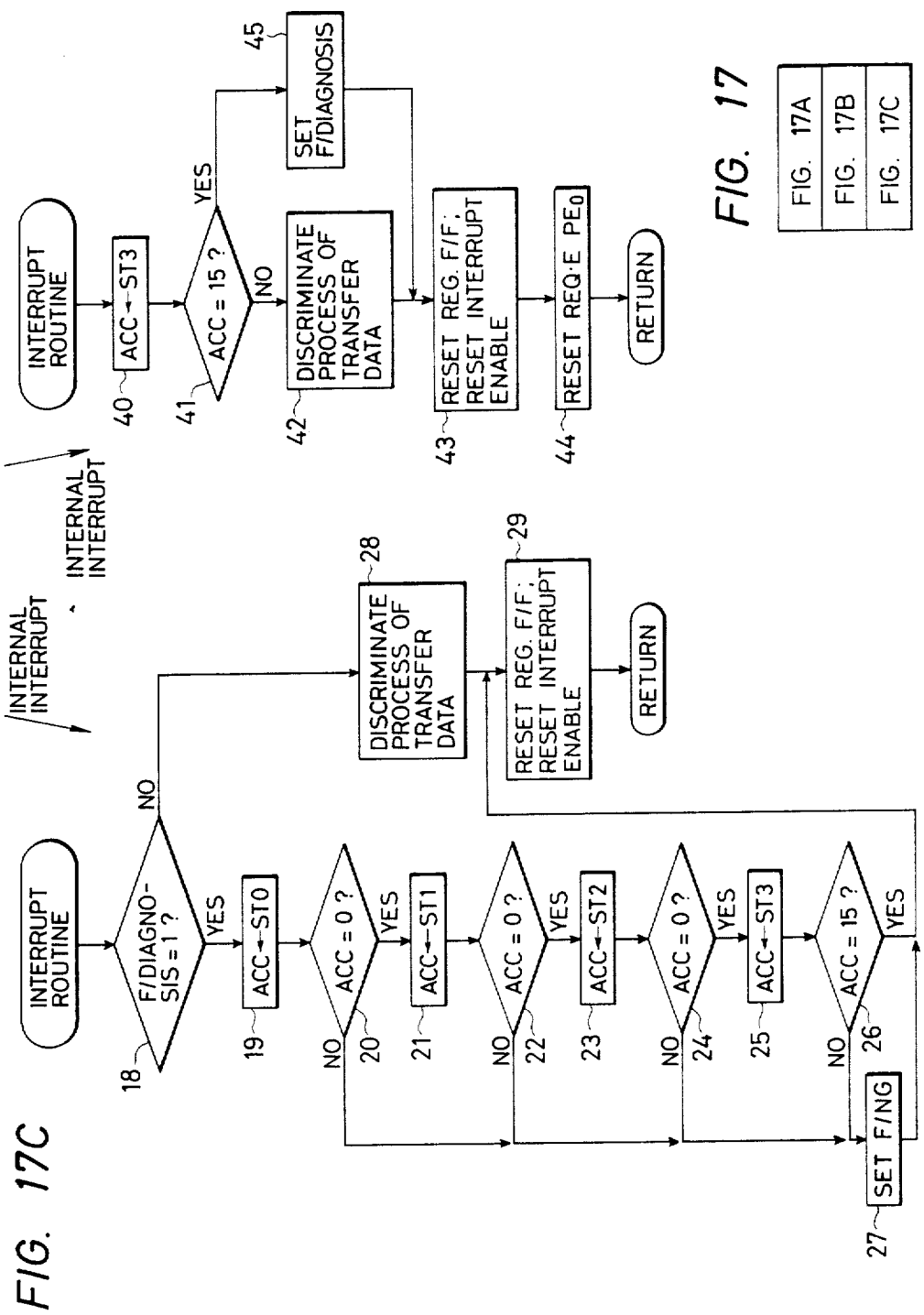

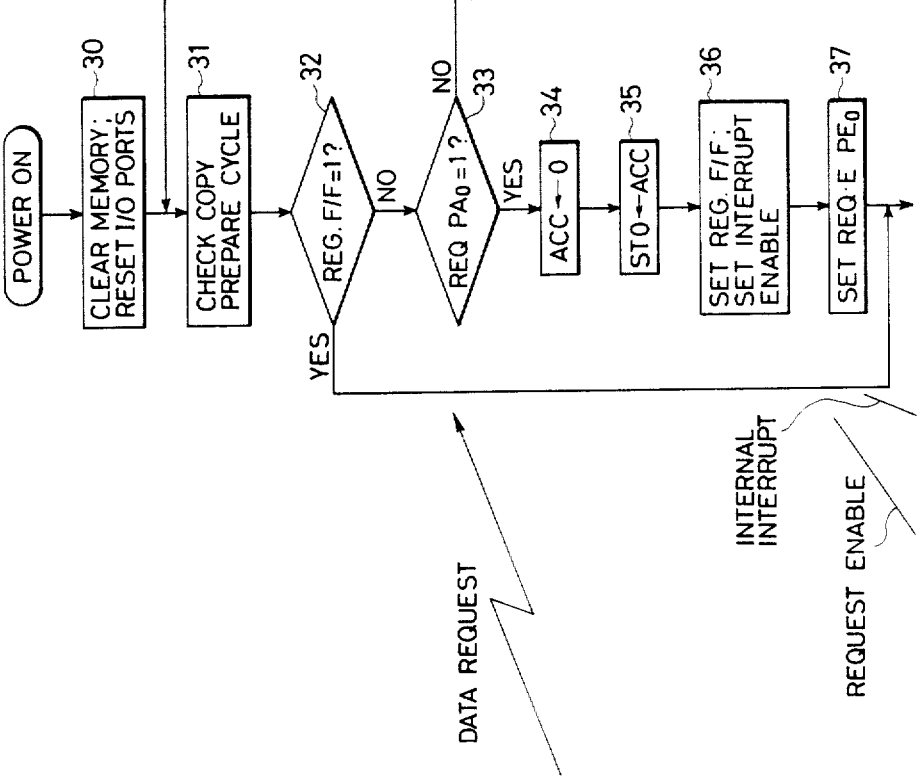
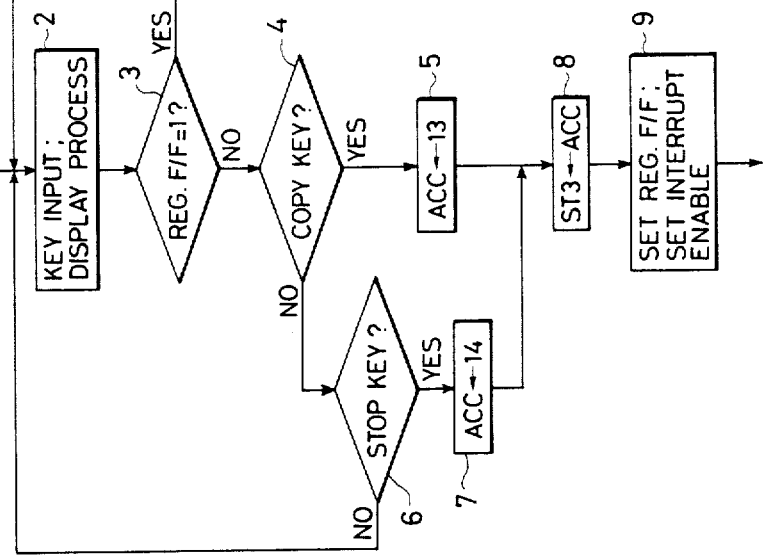
FIG. 20A
FIG. 20
| FIG. 20A |
| FIG. 20B |
| FIG. 20C |

IMAGE FORMING SYSTEM

This is a continuation of application Ser. No. 525,781, filed Aug. 10, 1983, now abandoned.

BACKGROUND OF THE INVENTION

1. Field of the Invention

The present invention relates to an image forming system for forming an image under the control of a control means having a program memory.

2. Description of the Prior Art

Significant recent developments have been made in electronic engineering. In particular, higher integration of electric or electronic circuits has been achieved, with an end result of a micro computer for controlling various types of equipment. With such a trend, a copy apparatus is increasingly often controlled by a micro computer. In an image forming apparatus such as a copy apparatus, if high performance, high speed processing and multifunctions are required, a plurality of micro computers rather than a single micro computer are required to separately control functions of a copy apparatus main body, an ADF (Auto Document Feeder), a sorter and the like. When a plurality of micro computers are operated to control different functions, means for performing parallel and serial transfer of data between I/O ports of the micro computers have been proposed. However, when a micro computer error occurs during such data transfer, for example, a defective contact error or noise between an interface and main body or between a peripheral and the interface when a peripheral is in use, the cause of such an error is hard to find, especially in the case of serial transfer, so that necessary measures cannot be implemented quickly.

When a serial transfer error is caused by a defective connector contact or by noise during the control of various apparatuses by a serial transfer means, either the copy apparatus main body or a peripheral may operate erratically, leading to a major accident. In a system having two micro computers A and B, for example, when the micro computers exchange a signal REQ-O signalling a need for data transfer and a signal REQ-E signalling that data can be received, a serial transfer operation is performed. The micro computer A generates signals REQ-O at a constant period and awaits signals REQ-E in return. However, if, for some reason, a signal REQ-E is not received by the micro computer A due to erratic operation of the program of the micro computer B, noise, a defective interface and the like, the micro computer A continues to monitor the signal REQ-E and holds up the program. Accordingly, the next processing sequence cannot be commenced.

When a timer is operated to check the signal, a timer is started as the micro computer A generates a signal REQ-O. It is checked if a signal REQ-E is received before a predetermined period of time preset in the timer has elapsed to perform diagnosis of the serial transfer means. Meanwhile, at the side of the micro computer B, after the signal REQ-E is generated, a timer is started by a similar means to that used in the micro computer A. If serial data is not received within the period of time preset in this timer, the micro computer B decides that there has been some abnormality. In such a case, if a data transfer abnormality is generated during a copy process, the respective micro computers may latch in respect of their programs. In particular, when an abnormality is generated during paper feed or exposure lamp lighting in a sequence control micro computer, the state in which the abnormality is generated is latched, and may significantly damage the overall system.

SUMMARY OF THE INVENTION

The present invention has been made in consideration of this and has for its object to provide an image forming system which is capable of resetting a control means for controlling peripherals so as to prevent erratic operation when a data transfer abnormality between peripherals occurs.

It is another object of the present invention to provide an image forming system which allows detection of an abnormality in data transfer between micro computers by connecting abnormality detection bars or short bars at specific positions of an interface of the micro computers.

It is still another object of the present invention to provide an image forming system which is capable of continuing a predetermined image forming process when a data transfer abnormality occurs during data transfer between peripherals, so that the system can stop safely It is still another object of the present invention to provide an image forming system which is capable of detecting an abnormality in a data exchange state between micro computers during data transfer between such micro computers, by using a timer for executing diagnosis of data transfer.

It is still another object of the present invention to provide an image forming system which is capable of detecting an abnormality in data transfer between micro computers during an initial period after power is turned on.

It is still another object of the present invention to provide an image forming system which checks an abnormality in data transfer between micro computers at a specific timing.

It is still another object of the present invention to provide an image forming system which detects an abnormality in data transfer between micro computers by executing a special data transfer by turning on a special checking means.

It is still another object of the present invention to provide an image forming system which is capable of detecting an abnormality in data transfer so that a problem such as erratic operation can be prevented.

BRIEF DESCRIPTION OF THE DRAWINGS

FIG. 6 shows a data format for transferring information from micro computer B to micro computer A;

DETAILED DESCRIPTION OF THE PRFERRED EMBODIMENTS

Figure 1:
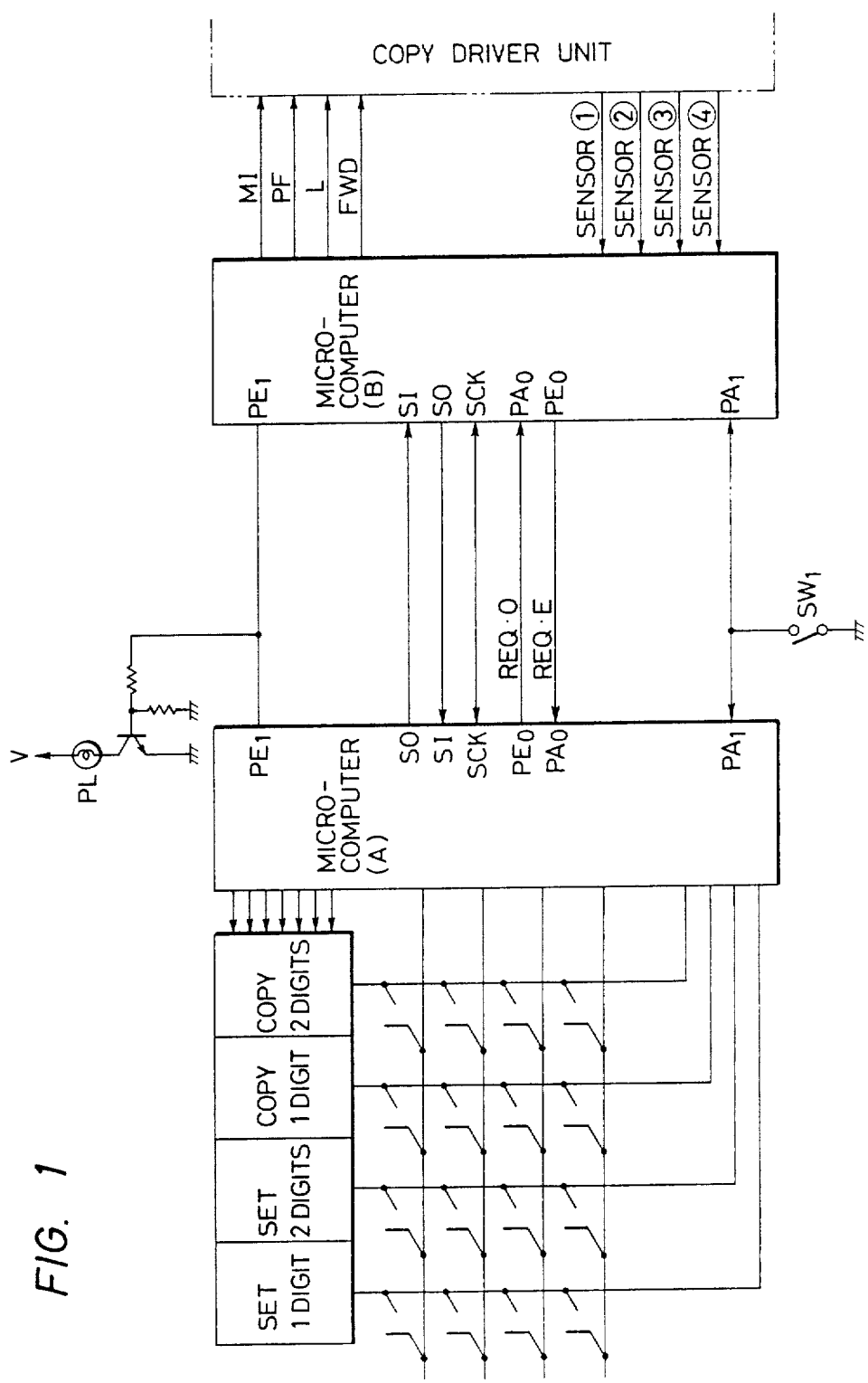
FIG. 1 is a block diagram of an image forming system controlled by micro computers.

FIG. 1 is a block diagram of an image forming system which is controlled by micro computers which provide control according to the present invention. The control means according to the present invention will be described with reference to two micro computers A and B referring to FIG. 1.

The micro computer A serves to "converse" with the operator, that is, to display the copy set number and copied number entered by means of keys or the like so as to signal to the operator a desired number of copies to be produced. The micro computer A also serves to control in real time a copy instruction (start), a stop, or a selection and display of the cassette size. Meanwhile, the micro computer B sequentially performs respective control steps, for example, copy process steps such as charging, exposure, transfer, charge removal, and fixing, thereby performing sequence control for copying. For this purpose, the micro computer B produces a signal for driving a main motor ($M_1$), a signal of paper feed timing (PF), a signal for driving an exposure lamp (L), an optical drive signal (FWD) and the like. In this embodiment, information exchange, that is, data exchange between the micro computers A and B, is performed by serial transfer means.

Referring to FIG. 1, a serial output port SO from the micro computer A is connected to a serial input port SI of the micro computer B, a serial output port SO of the micro computer B is connected to a serial input port SI of the micro computer A, and a shift clock port SCK of the micro computer A is connected to the same of the micro computer B. A signal REQ·O for requesting a data transfer is supplied from an output port $PE_O$ of the micro computer A to an input port $PA_O$ of the micro computer B. When the micro computer B is ready for data transfer or in the stand-by mode, a signal REQ·E is supplied from an output port $PE_O$ of the micro computer B to an input port $PA_O$ of the micro computer A.

When the micro computer A detects depression of a copy start button by the operator and transfers data of a copy start instruction to the sequence control micro computer B, data of the copy start instruction to be produced from the serial output port SO of the micro computer A is set in a shift register thereof. Then, the micro computer A produces a signal REQ·O to the micro computer B. In response to the signal REQ·O from the micro computer A, the micro computer B sets data on its current state, that is, whether a copy cycle is currently in the stand-by mode, in a shift register thereof. Thus, the micro computer B produces a signal REQ·E so as to signal to the micro computer A that the micro computer B is ready for receiving data. When this signal REQ·E is received by the micro computer A, data transfer is initiated. When data transfer is completed, internal interrupts are generated in the micro computers A and B. In the internal interrupt process step, the data is discriminated. FIG. 1 further shows a data transfer diagnosis switch $SW_1$ and an abnormality display lamp PL. The timer means is operated at the same time as the diagnosis switch is turned on.

Figure 2:
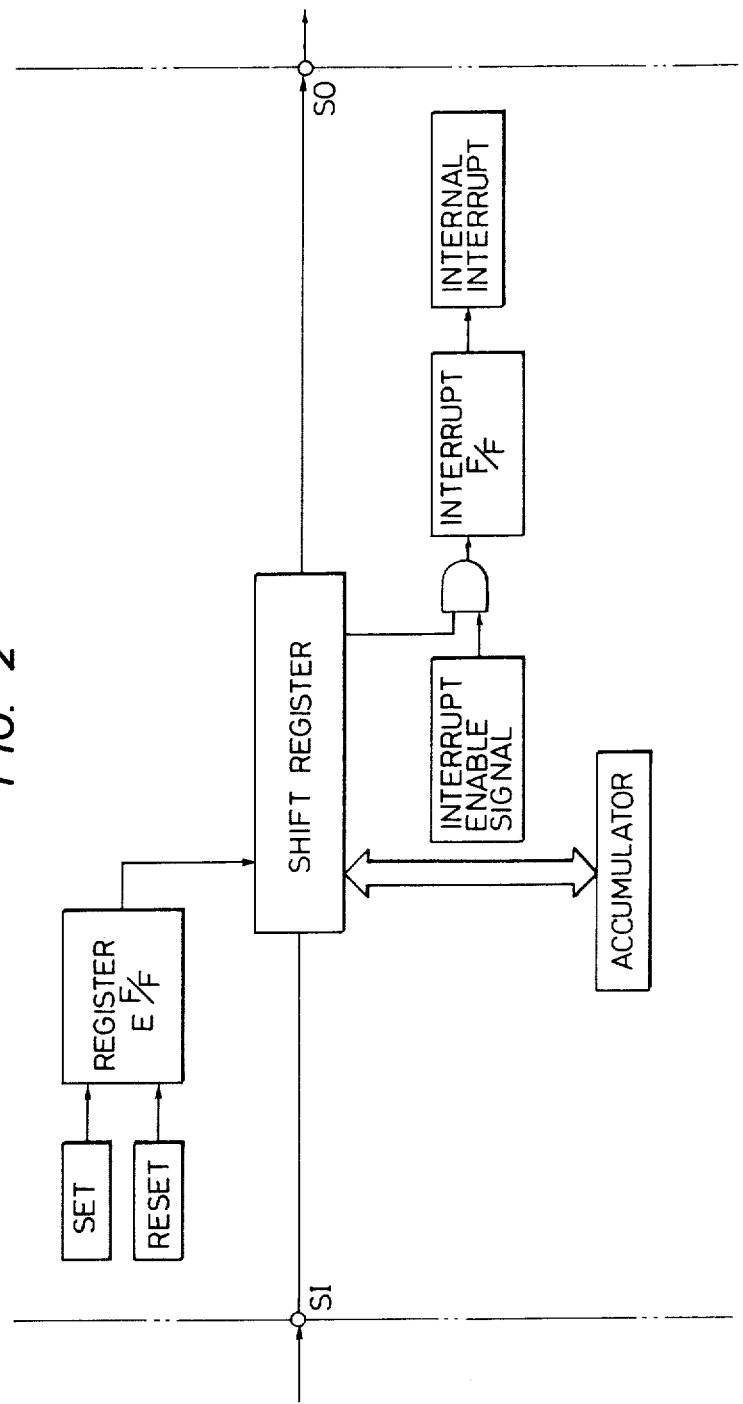
FIG. 2 is a control block diagram of a shift register.

FIG. 2 is a control block diagram of a shift register of the type described above. The operation of the shift register can be controlled by controlling a register F/F by means of software. An internal interrupt is enabled by setting an interrupt F/F. The interrupt F/F is set when both an interrupt enable signal and a signal which is generated when the shift register stops operating are received. The shift register is connected to an accumulator ACC through an internal bus line inside the micro computer. Data can be set from the ACC to the shift register, and data can be transferred from the shift register to the ACC.

Figure 3:
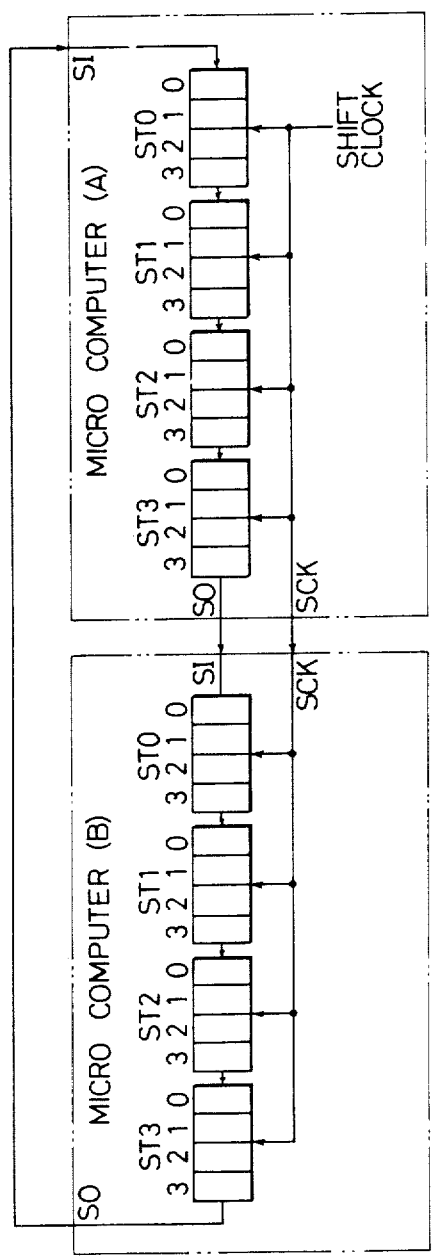
FIG. 3 is a view showing connection details between transfer means comprising serial shift registers of micro computers A and B, respectively.

FIG. 3 is a detailed view of the arrangement for connecting transfer means, respectively comprising a serial shift register, of the micro computers A and B. The shift register used in the present invention is a 16-bit shift register having four 4-bit transfer registers ST0 to ST3. The shift register operates in synchronism with a shift clock SCK generated from the micro computer A.

Figure 4:
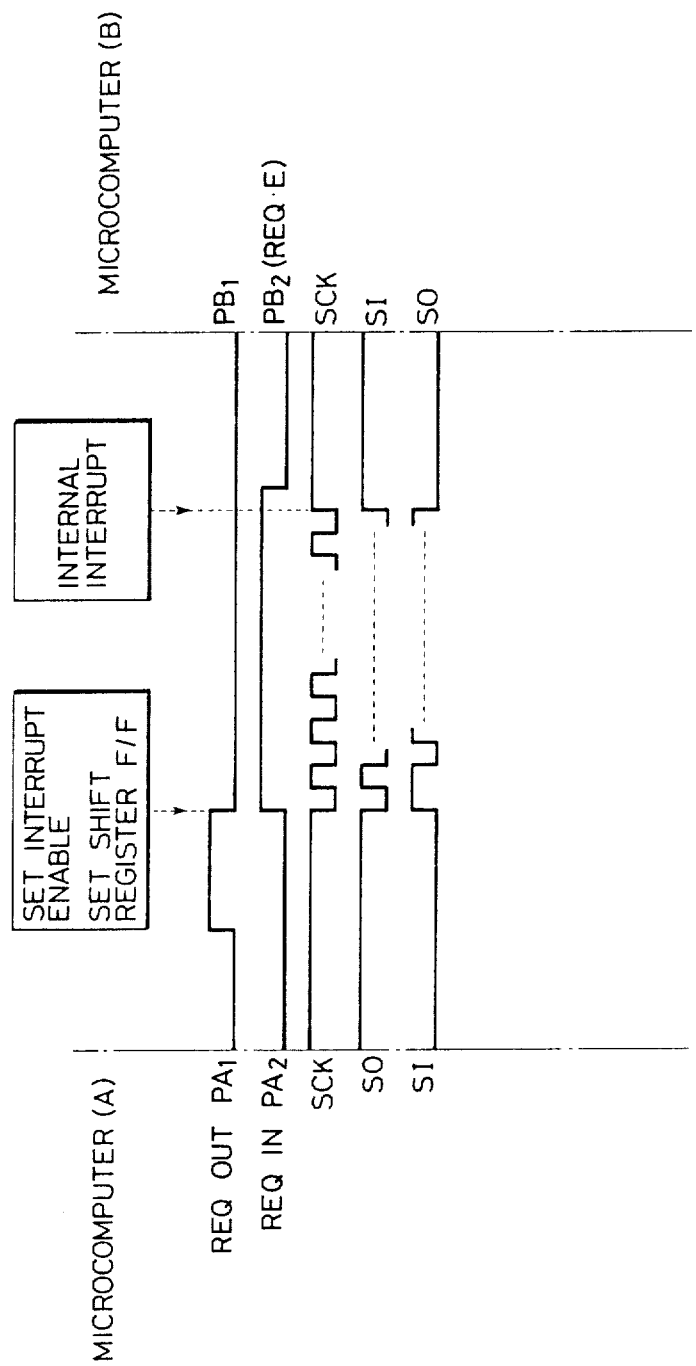
FIG. 4 shows timing charts of serial data transfer.

FIG. 4 shows timing charts of serial data transfer. As has been described above, upon exchange of a signal REQ·O and a signal REQ·E, the micro computers A and B set the respective data in the corresponding shift registers. The interrupt F/F and the register F/F are set. Then, shift clocks SCK are generated by the micro computer A, and the respective data set in the respective shift registers are transferred to the destination micro computers. When the shift clocks cease to be generated, an internal interrupt is generated in the micro computers A and B. The received data are discriminated in the respective internal interrupt process steps.

Figure 5:
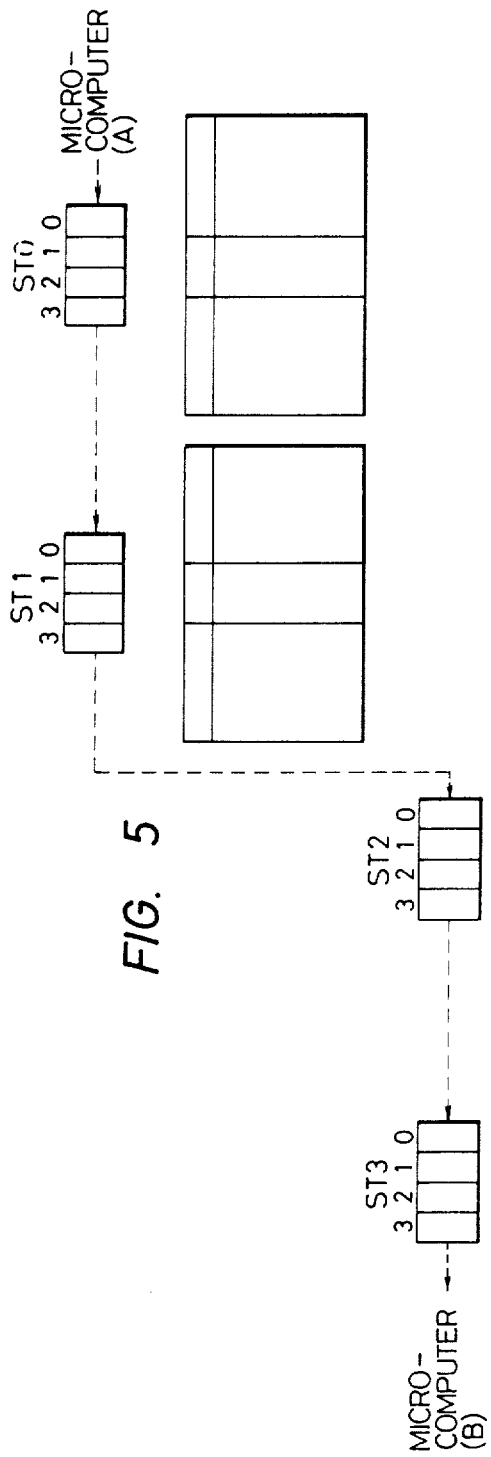
FIG. 5 shows a data format for transferring information from micro computer A to micro computer B.

FIG. 5 shows the data format for transferring information from the micro computer A to the micro computer B.

FIG. 6 shows the data format for transferring information from the micro computer B to the micro computer A. When it is detected that the diagnosis switch $SW_1$ is turned on, the micro computers A and B set data 15 in transfer registers ST3, respectively.

A case is described above wherein two micro computers are used for controlling an apparatus. However, when the apparatus is a system, the system needs an ADF unit, a sorter unit and the like in addition to the copy apparatus main body.

Figure 7:
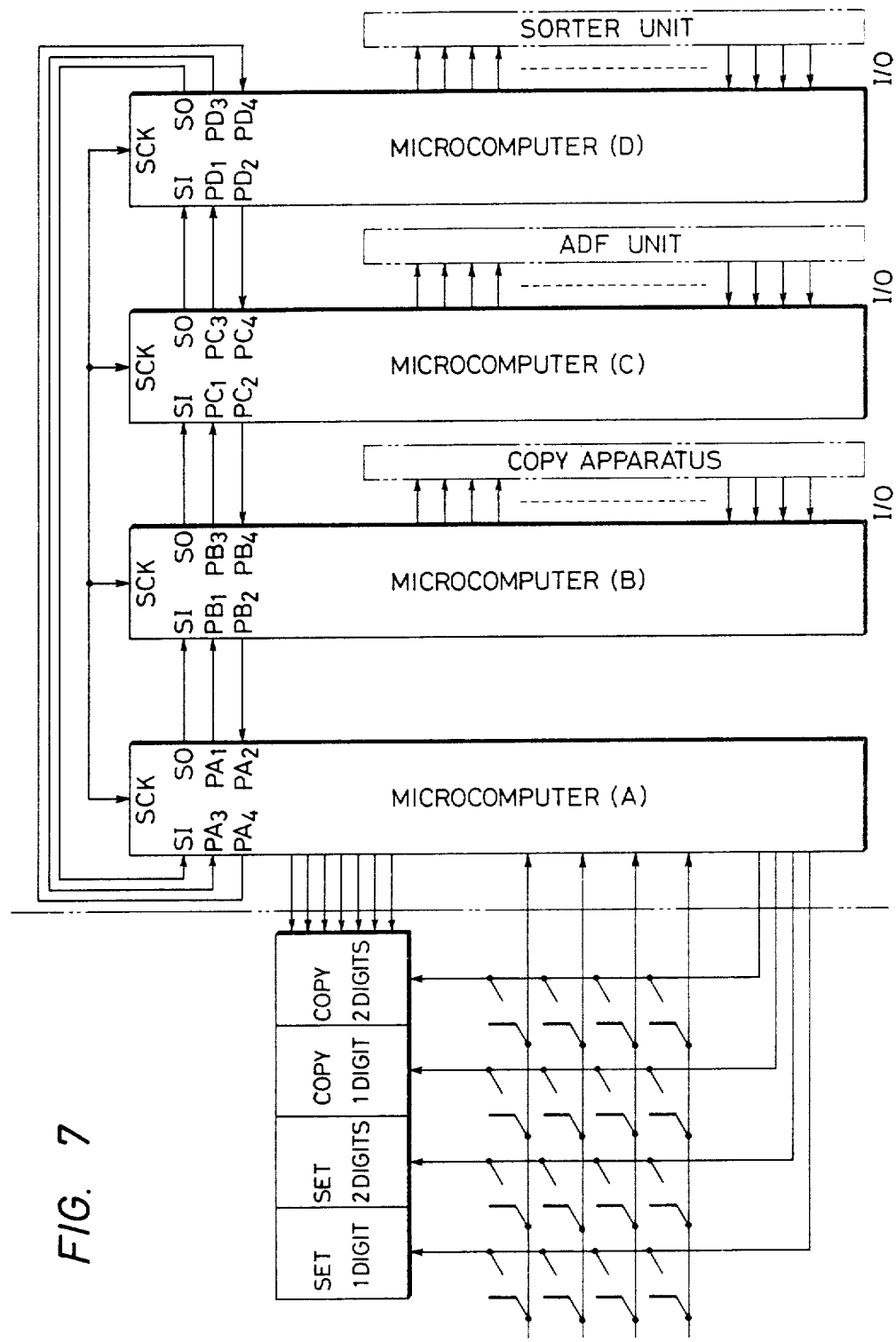
FIG. 7 is a control block diagram including ADF and sorter control.

FIG. 7 is a control block diagram of a system involving control of an ADF unit and a sorter unit in addition to the transfer means as described above as a basis. The micro computers A and B perform the functions as described above, a micro computer C controls the ADF unit, and a micro computer D controls the sorter unit. The serial shift registers of the respective micro computers as information exchange means are connected in series with each other as shown in FIG. 7 so as to perform effective and efficient data transfer.

Figure 8:
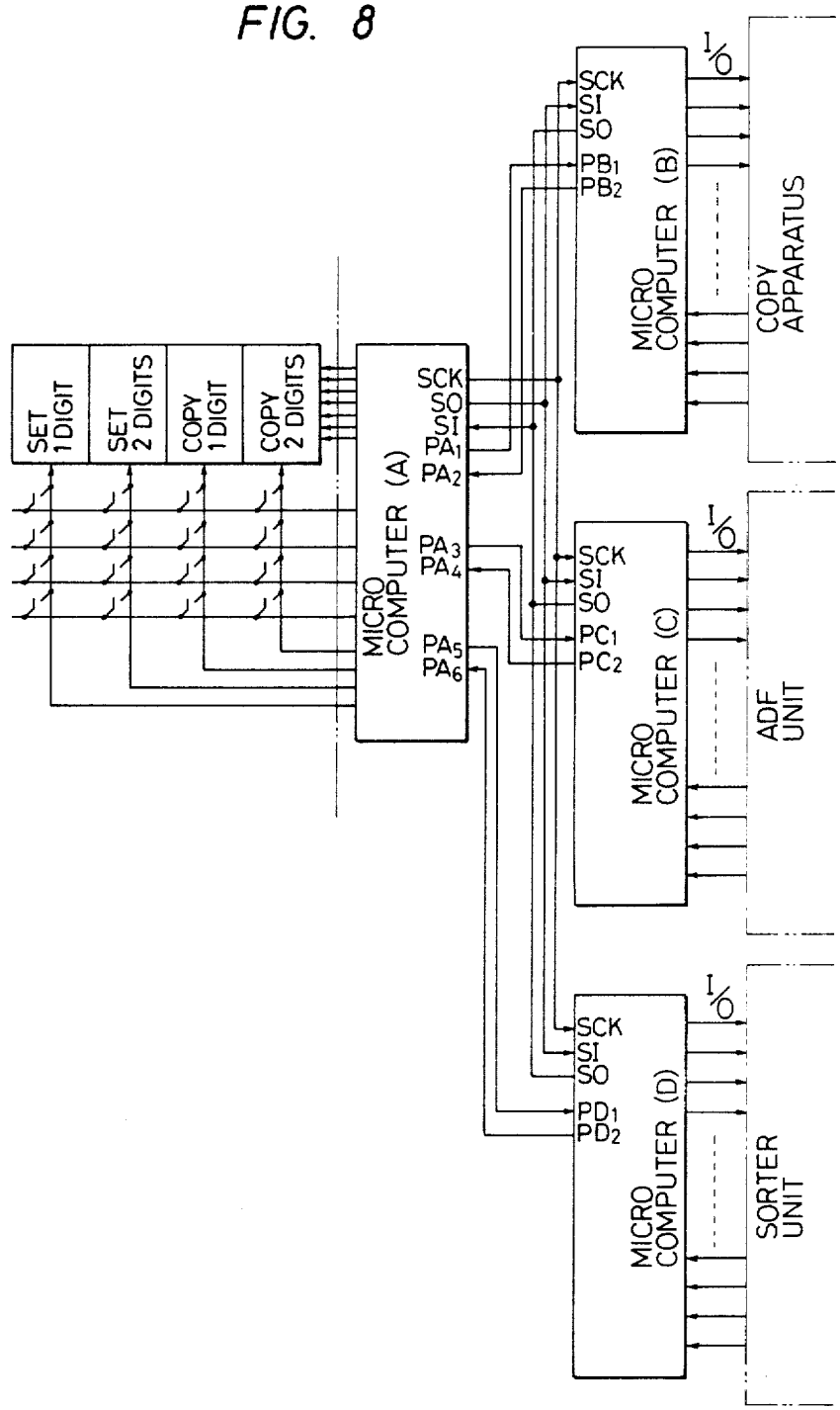
FIG. 8 is a control block diagram wherein serial shift registers are connected in parallel.

FIG. 8 shows a control block diagram of a system wherein an ADF unit and a sorter unit which are incorporated additionally, as in the case of FIG. 7, are connected in parallel with each other. As compared to a case wherein the serial shift registers are connected in series with each other as in FIG. 7, a transfer speed (time required for discrimination) is fast in a case wherein the serial shift registers are connected in parallel with each other as shown in FIG. 8.

Figure 9A:
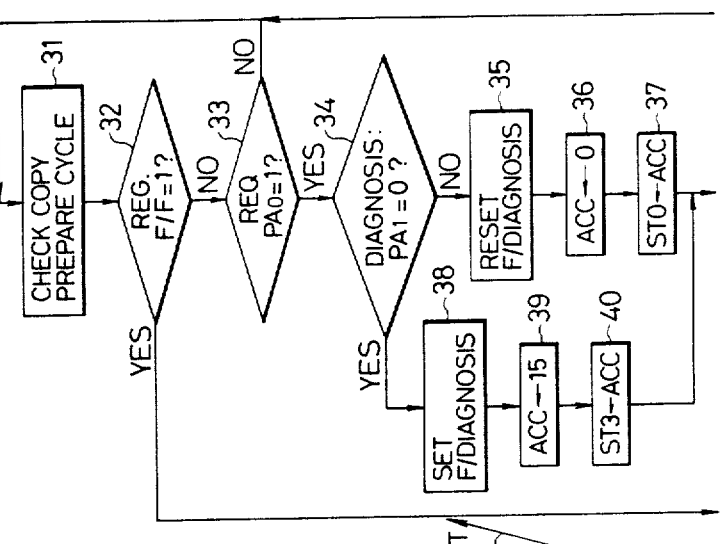
FIG. 9 composed of FIGS. 9A, 9B and 9C is a flow chart showing a data transfer operation between two micro computers A and B.
Figure 9:
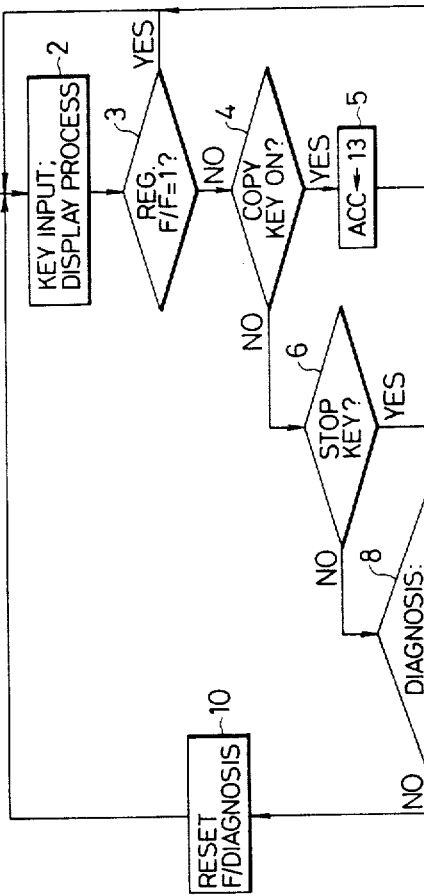
Figure 9C:
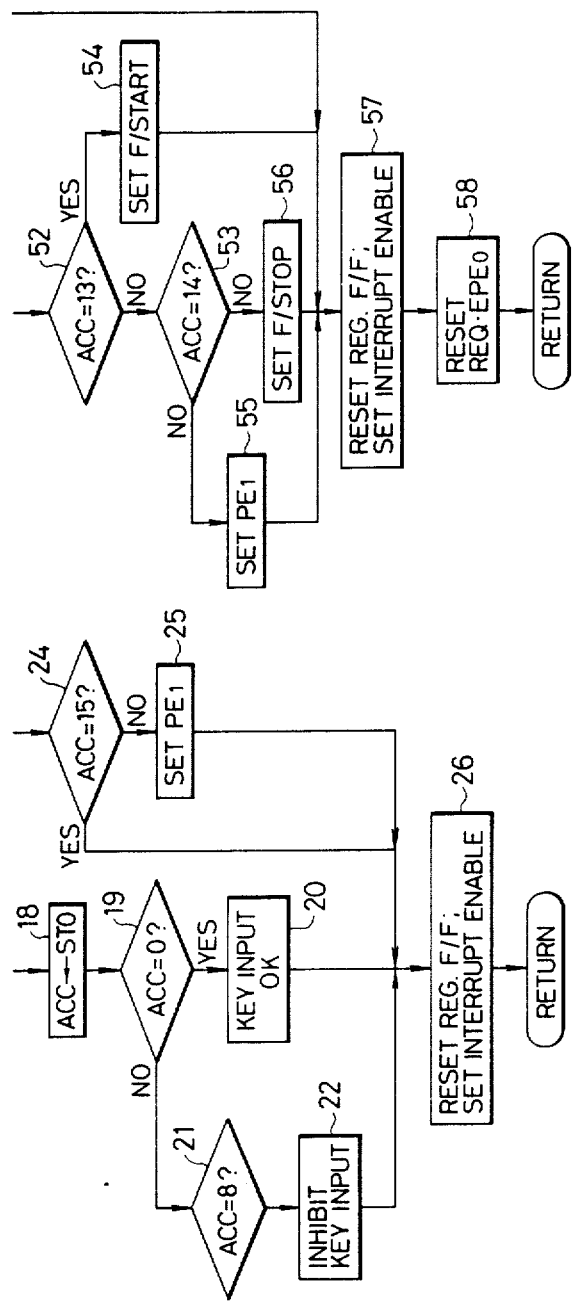

FIG. 9 is a flowchart of a data transfer operation between micro computers A and B according to the present invention. A description will first be made with reference to the micro computer A. After power on, in step 1 the data memory and I/O ports are reset (cleared). In step 2, descrimination of key input from an operating section (not shown) and a display process are performed. In step 3, it is discriminated if the register F/F is set at logic level "1". This register F/F serves to discriminate if the shift register is in operation. In step 4, it is checked if the copy start button is depressed in step 2. If YES in step 4, the flow advances to step 5. Data 13 representing the copy start instruction is set in the register ST3 as data to be transferred to the sequence control micro computer B. In order to accomplish this, data 13 is first set in the accumulator ACC in step 5. In step 11, the content of the accumulator ACC is set in the register ST3 of the serial shift register.

If the stop key is depressed in step 2, it is confirmed in step 6 that the stop key is depressed. Since YES in step 6, data 14 is set in the accumulator ACC in step 7.

The content of the accumulator ACC is set in the register ST3 in step 11. In step 12, the register F/F for enabling the shift register and the interrupt enable for setting the interrupt F/F are set. In step 13, the output port $PE_0$ is set so as to supply a signal REQ·O to the micro computer B. In step 14, it is checked whether the input port $PA_0$ is set. When YES in step 14, the flow advances to step 15 wherein the signal REQ·O is reset. In step 16, data transfer is performed.

The data transfer means of the micro computer A is described above. As shown in FIG. 1, the switch $SW_1$ is respectively connected to input ports $PA_1$ of the micro computers A and B, respectively. Data diagnosis operation can be performed at a predetermined timing by means of a timer which is started upon turning on of the switch $SW_1$ as an external instruction means. In the micro computer A, in step 8 shown in FIG. 9, the switch $SW_1$ is checked by checking the input port $PA_1$. When the switch $SW_1$ is turned on, YES is obtained in step 8 and the flow advances to step 9. In step 9, data 15 as diagnosis data to be supplied to the transfer register ST3 in step 11 later is set in the accumulator ACC and the flag F/DIAGNOSIS is set. The flow then advances to step 11. The switch $SW_1$ is turned on and the micro computer A determines that the diagnosis mode is set. The micro computer A then transfers diagnosis data to the micro computer B in step 16 by the method described above. The diagnosis mode is automatically reset when a diagnosis switch is turned off after a predetermined time, counted by a timer started upon turning on of the diagnosis switch, has elapsed.

A description will now be made with reference to the micro computer B. After power on, a data memory (RAM) and I/O ports are reset in step 30. In step 31, a copy prepare cycle is checked. In step 32, the operation of the shift register is checked by checking if the register F/F is set. In step 33, it is checked if a data transfer request signal REQ·O has been received from the micro computer A by checking the input port $PA_0$. If YES in step 33, the flow advances to step 34 wherein it is checked if the data diagnosis switch $SW_1$ is depressed by checking the input port $PA_1$. If NO in step 34, the flag F/DIAGNOSIS is reset in step 35. In steps 36 to 42 to follow, information for signalling the operating state of the micro computer B to the micro computer A is set in the transfer registers ST0 to ST3, respectively. However, if YES in step 34, the program advances to step 38 wherein the flag F/DIAGNOSIS is set. In step 39, data 15 to be set in the transfer register ST3 is set as the diagnosis data in the accumulator ACC, as in the case of the micro computer A. In step 40, the data is set in the register ST3. The diagnosis switch $SW_1$ is connected to the micro computers A and B, respectively, as shown in FIG. 1. Therefore, the diagnosis mode is discriminated almost simultaneously in the micro computers A and B, so that data diagnosis can be performed.

In steps 35 to 42, data 0 representing that the micro computer B is in the standby mode is set in the transfer register ST0. The content of the data transferred from the micro computer B to the micro computer A is as shown in FIG. 6. After the data is set in the transfer register, the register F/F and the interrupt enable are set, the output port $PE_0$ is set, and a signal REQ·E representing that the micro computer B is in the standby mode is produced in step 42. In step 43, it is checked if the flag F/START is set so as to determine if the copy start instruction is transferred by an interrupt routine.

The interrupt routine to be performed when the transfer is completed in the micro computer B will now be described. The interrupt generation timings of the micro computers A and B are almost simultaneous.

A description will first be made with reference to the micro computer A. When an interrupt is generated, since the data transferred from the micro computer B is set in the transfer register ST0, the content of the transfer register (ST0 and diagnosis flag F/DIAGNOSIS in the case to be described here) is set in the accumulator ACC (steps 18, 19 and 21). When it is determined in step 17 that the diagnosis flag F/DIAGNOSIS is reset, the content of the accumulator ACC is discriminated in steps 19 and 21. If ACC=0 in step 19, it represents that the micro computer B is in the standby mode. Then, the process flag for enabling key input and display is controlled (step 20). If it is determined in step 21 that ACC=8, it is determined that the micro computer B is in the copy process. Then, the flag for enabling inhibition of key input and the like is controlled (step 22). In step 26, the register F/F and the interrupt enable are reset.

If the mode is the data diagnosis mode, YES is obtained in step 17. Therefore, the content of the transfer register ST3 for checking the diagnosis data from the micro computer B is transferred to the accumulator ACC, in step 23. In step 24, the content of the accumulator ACC is discriminated. If the content of the accumulator ACC is determined to be 15, the program advances to step 26. However, if data transfer or the transfer mechanism is subject to an abnormality within a predetermined period of time counted by a timer, abnormal data is produced and the content of the accumulator ACC is not 15. In this case, the flow advances from step 24 to step 25 wherein an output port PE$_1$ for displaying an abnormality is set so as to turn on the lamp.

In the interrupt routine of the micro computer B, as in the case of the micro computer A, the content of the transfer register ST3 is transferred to the accumulator ACC (step 50). In step 51, it is discriminated if the data in the accumulator ACC is 15. If NO in step 51, it is then discriminated in step 52 if the data in the accumulator ACC is 13. If YES in step 52, it is determined that a copy start instruction has been received. Then in step 54, the flag F/START is set. If NO in step 52, it is checked in step 53 if the content of the accumulator ACC is 14. If YES in step 53, it is determined that a copy stop instruction has been received. Then, in step 56, the flag F/STOP is set. In step 57, the register F/F and the interrupt enable are reset. In step 58, the output port PE$_0$ for a signal REQ·E is reset. Therefore, if the flag F/START is set in step 54 in the micro computer B, the copy process is started. If the content of the accumulator ACC is not 13, 14 or 15, it is determined that there has been an abnormality. Then, the output port PE$_1$ of the micro computer B is set in step 55. If the content of the ACC is 15 in step 51, the flow advances to step 57. The copy process is performed in step 45 of the main routine. Step 46 is a step relating to the data transfer means which checks if the flag F/STOP is transferred in step 47. If YES in step 47, the copy last rotation process in step 49 is started after step 48. In this embodiment, a description has been made of data diagnosis, a copy start and a copy stop. However, in practice, the amount of data to be transferred is large as shown in FIGS. 5 and 6. The above description has also been made with reference to a case wherein two micro computers are used.

Figure 10:
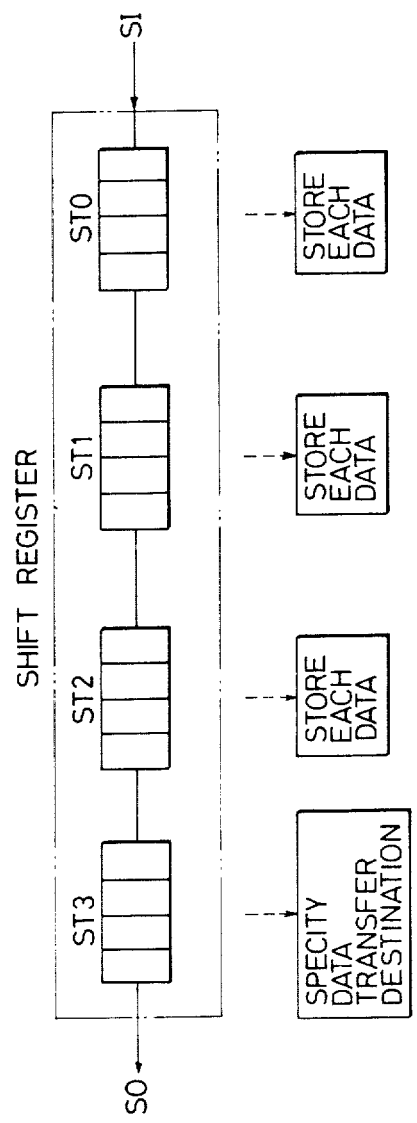
FIG. 10 is a view showing a shift register a transfer destination number whereof is predetermined.

A description will now be made with reference to FIGS. 7 and 8 wherein three or more micro computers are used and the serial transfer means are series- or parallel-connected. The data transfer method of each micro computer remains basically the same as that of the two micro computers described above. However, in order to reliably transfer data to a desired micro computer, each micro computer is numbered. Each micro computer adds its own number to the data transferred therefrom. A micro computer which has received the data checks if the data received is to be received by itself. FIG. 10 is a view showing the shift register of each micro computer with its own number. The data transfer destination data is allocated at the transfer register ST3. In this embodiment, 0001(1) as the content of the accumulator ACC represents micro computer A, 0010(2) represents micro computer B, 0011(3) represents micro computer C, and 0100(4) represents micro computer D. Thus, when a micro computer desires to transfer data to another micro computer and sets the transfer data in its transfer register, it sets the data transfer destination (number of the destination micro computer) in its transfer register ST3. After the data is transferred and an interrupt routine is commenced, the destination micro computer checks the content of its own transfer register ST3 to determine whether the received data is to be received by itself. If the number of the data now set in its transfer register ST3 corresponds to its own number, the micro computer which has received this data reads out the data set in the other transfer registers ST0 to ST2 and discriminates the content of the data.

Figure 11:
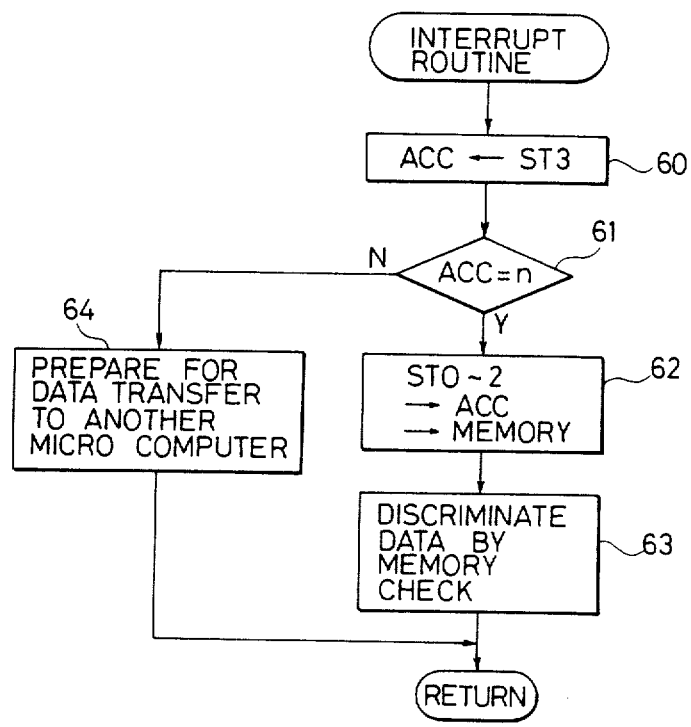
FIG. 11 is a flowchart for discriminating a transfer destination.

FIG. 11 shows a flowchart of this operation. Note that FIG. 11 shows an interrupt routine after an interrupt is generated upon completion of data transfer between micro computers. In step 60, each micro computer which has been involved in data transfer transfers the content of the transfer register ST3 to the accumulator ACC. In step 61, the content of the accumulator ACC is checked. If the content of the accumulator ACC is 1, the destination micro computer intended is the micro computer A, 2 indicates the micro computer B, 3 indicates the micro computer C, and 4 indicates the micro computer D. If the micro computer which has received data determines that the destination micro computer is itself, the contents of the transfer registers ST0 to ST2 are stored in the data memory (RAM) through the accumulator (ACC) in step 62. Then, in step 63, the content of the data which is stored in the RAM is discriminated, and proper processing is performed. If it is determined in step 61 that the destination micro computer is not itself, the program advances to step 64. In step 64, preparation for transferring the data to another micro computer is performed. A method for preparing to transfer the data to a desired micro computer by storing the data in its shift register is the same as that described with reference to steps 3 to 16 in FIG. 9. However, note that in this case the number of the destination micro computer must be set in the transfer register ST3. Accordingly, information exchange can be easily performed between three or more micro computers even if these micro computers are connected in series or parallel with each other. However, when the serial transfer means are connected in parallel with each other, as shown in FIG. 8, the micro computer A serves as a master micro computer; the micro computer A alone must discriminate the data transfer destination data of each micro computer. If the serial transfer means are connected in series with each other, each micro computer (A, B, C or D) must be able to discriminate the data transfer destination data. In view of this, it is, in some cases, advantageous to connect the serial transfer means in parallel with each other as shown in FIG. 8. Whether the serial transfer means are connected in series or parallel with each other, a diagnosis switch can be incorporated so as to discriminate each data as shown in FIG. 1.

As has been described above, diagnosis of an error generated during data transfer between micro computers is performed at a predetermined timing, e.g. turn-on of the power supply by utilizing timers. Accordingly, erratic operation of a copy apparatus due to an error in data transfer between micro computers can be prevented, and a time-consuming cause-finding procedure upon generation of an error can be eliminated.

The system of the present invention also has the effect of allowing a quick image forming operation, and provides improved performance.

Figure 12:
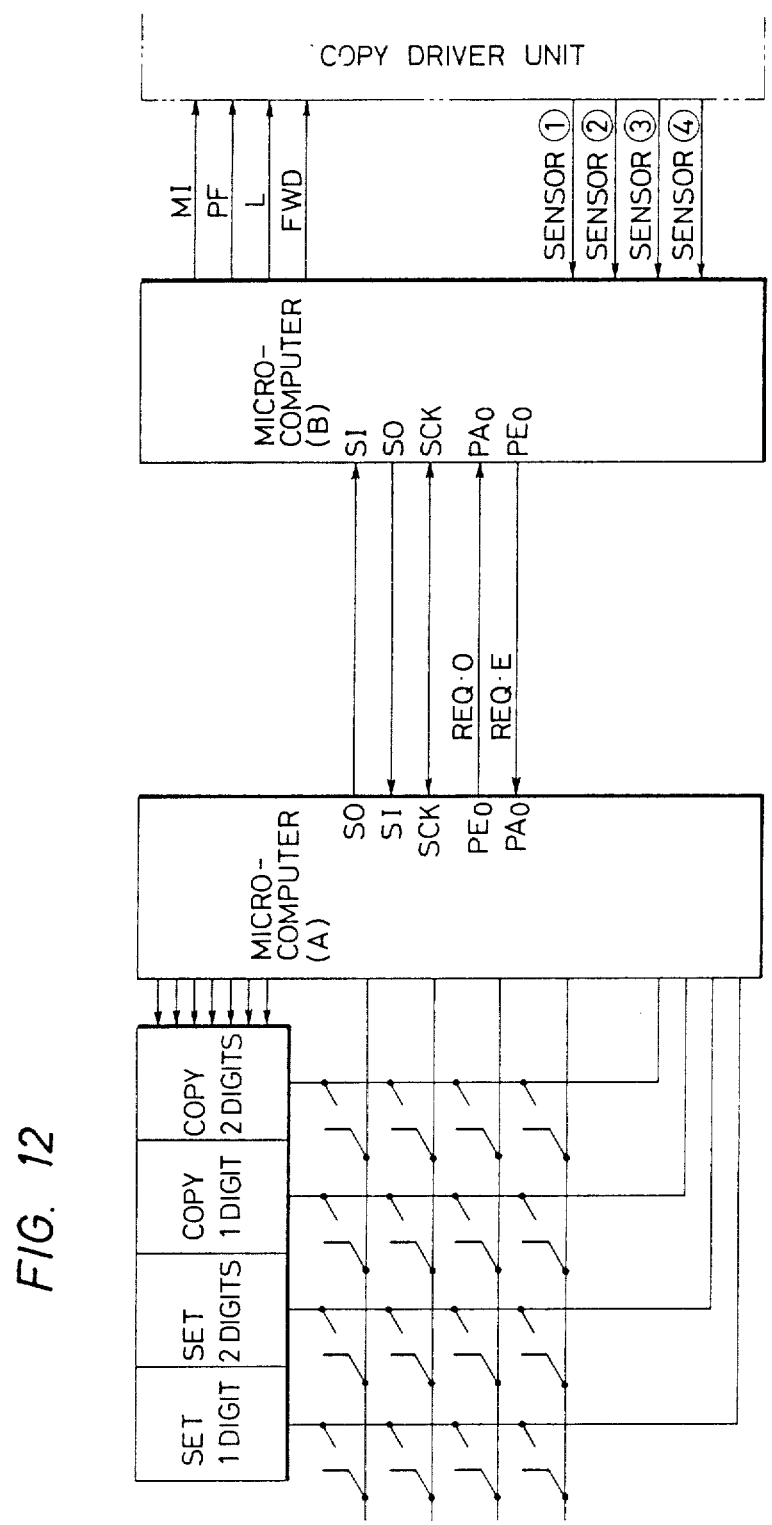
FIG. 12 is a block diagram of an image forming system.
Figure 13:
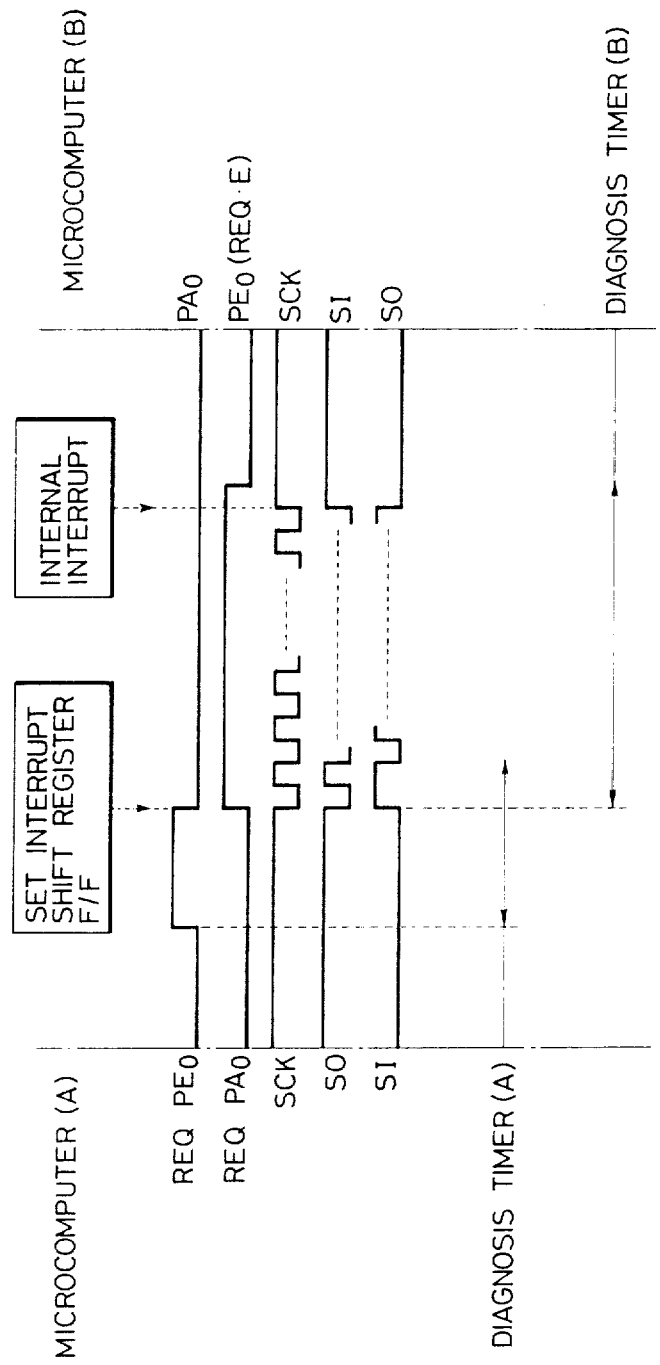
FIG. 13 shows timing charts of serial transfer involving diagnosis timers.

A description will now be made with reference to an image forming system wherein a predetermined image process is performed upon detection of a data transfer error and thereafter the image forming system is stopped safely. FIG. 12 is a block diagram of such an image forming system which is similar to that shown in FIG. 1. The system in FIG. 12 does not include a diagnosis switch SW$_1$ or a lamp. The control block diagram and connections of the shift registers are the same as those shown in FIGS. 2 and 3. FIG. 13 shows timing charts of a section having diagnosis timers A and B and for serial data transfer. The diagnosis timer A checks a signal REQ·E when its time is up, while the diagnosis timer B checks whether an internal interrupt has been generated. The details of these timers will be described hereinafter.

Figures 14, 14A:
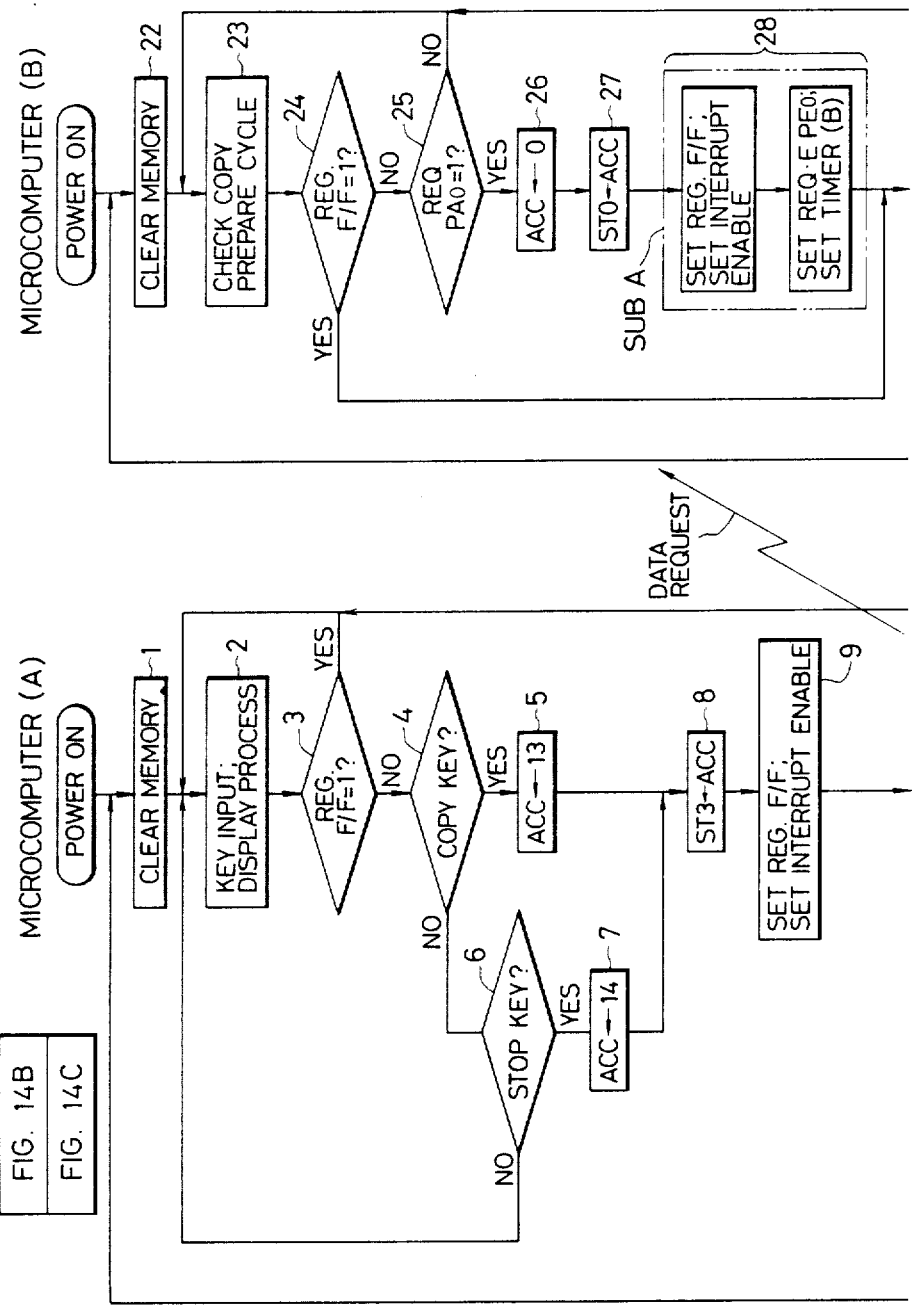
FIG. 14 composed of FIGS. 14A, 14B and 14C is a flowchart of data transfer between two micro computers A and B involving diagnosis timers.
Figure 14B:
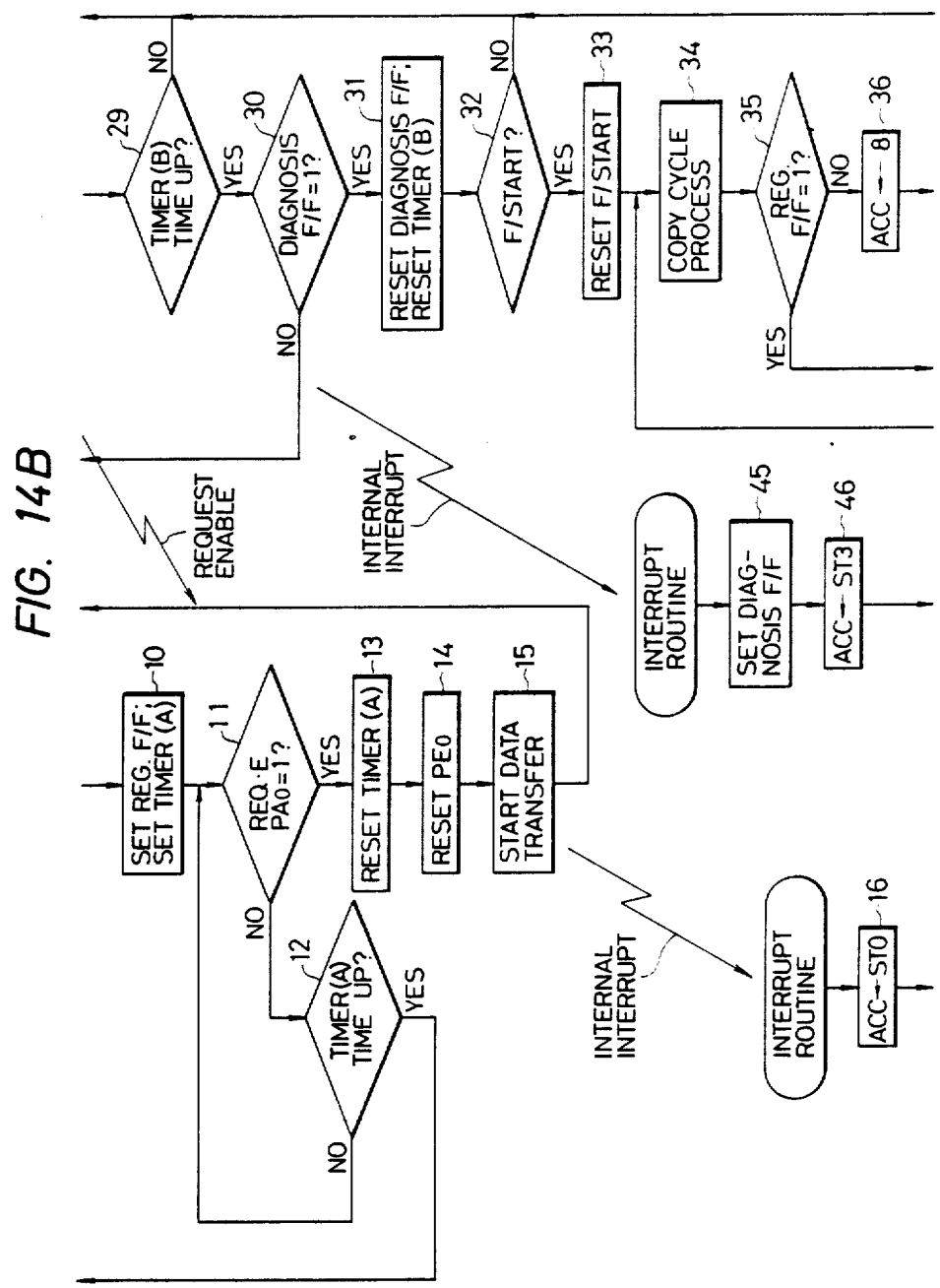
Figure 14C:
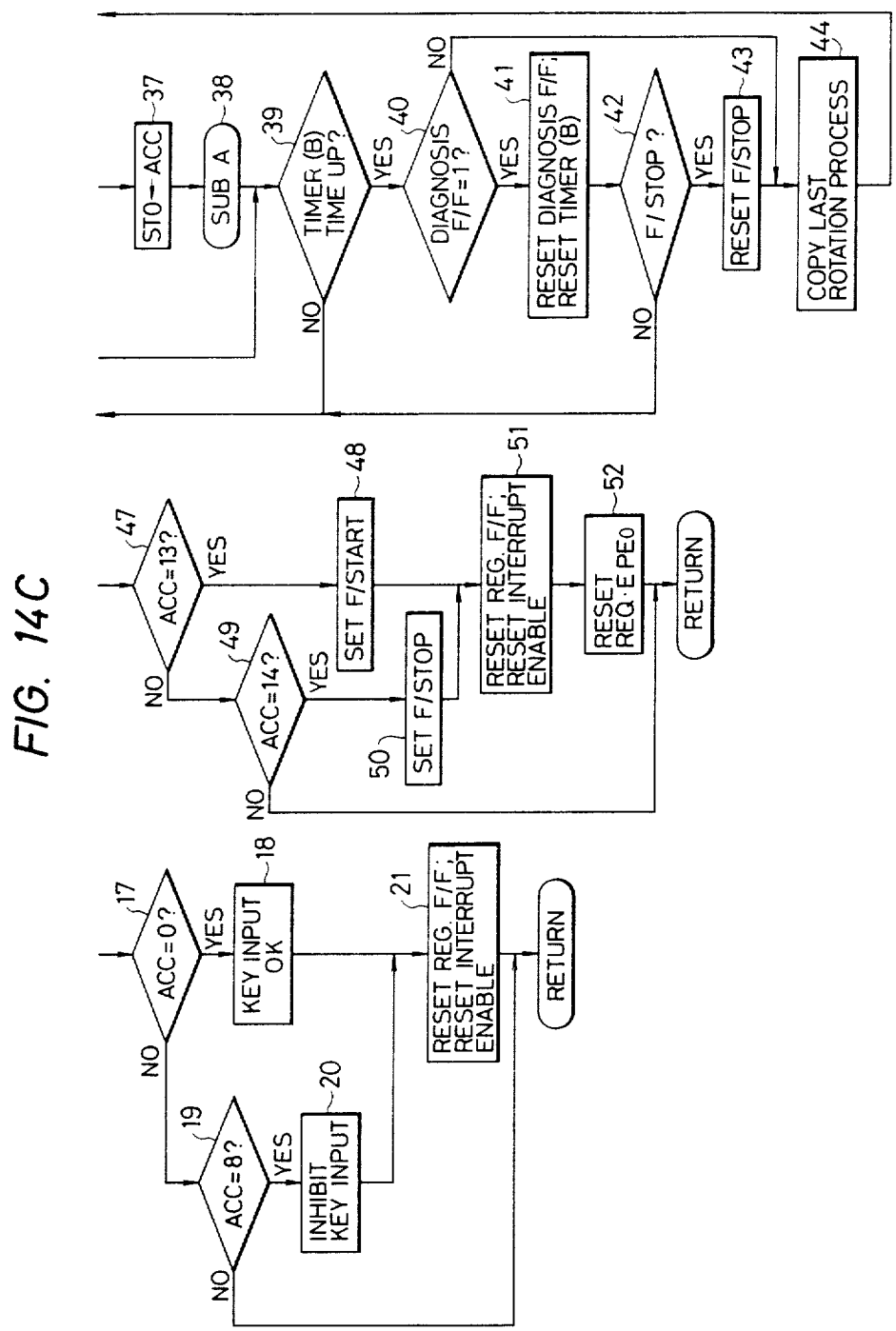

FIG. 14 is a flowchart showing the sequence of a data transfer operation between two micro computers A and B having the diagnosis timers A and B, respectively, described above. The operation will be described with reference to the flowchart shown in FIG. 14. After power on, a data memory, I/O ports and the like are reset (cleared) in step 1. In step 2, descrimination of key input from an operation section (not shown) and display processing are performed. In step 3, it is discriminated if a register F/F is set. This register F/F serves to check if the shift register is operating. In step 4, it is discriminated if the copy key is depressed in step 2. If YES is step 4, data 13 as a copy start instruction which is to be supplied to the sequence control micro computer B is set in a transfer register ST3 of the shift register as a serial transfer means in step 8, as has been described with reference to FIG. 5. In order to perform this, data 13 is set in an accumulator ACC in step 5. In step 8, the content of the accumulator ACC is set in the transfer register ST3 of the shift register. If a stop key has been depressed, this is confirmed in step 6 and data 14 is set in the accumulator ACC in step 7. After the data in the accumulator ACC is set in the transfer register ST3 in step 8, the register F/F for enabling the shift register and an interrupt enable for setting an interrupt F/F are set in step 9. In order to signal to the micro computer B that data is to be transferred thereto, an output port $PE_0$ of the micro computer A is set to supply a signal REQ·O to the micro computer B and the diagnosis timer A is set, in step 10. In step 11, it is checked if an input port $PA_0$ of the micro computer A is set so as to determine if a signal REQ·E is received from the micro computer B. If YES in step 11, the flow advances to step 13 wherein the timer A is reset. After the output terminal $PE_0$, and hence, the signal REQ·O is reset in step 14, the data is transferred in step 15.

For performing data diagnosis in the present invention, it is checked in step 12 if the timer A is time up so as to determine if the signal REQ·E is returned from the micro computer B within a predetermined period of time in step 11. If YES in step 12, the flow returns to step 1 wherein the data memory, the I/O ports and the like are cleared for initialization.

If a signal REQ·O is detected within the predetermined period of time in step 11, the flow advances to step 13 wherein the timer A is reset, as described above.

A description will now be made with respect to the micro computer B. After power on, in step 22, a data memory, I/O ports and the like are cleared (reset). After checking the copy cycle in step 23, a register F/F for confirming the shift register operation is checked in step 24. In step 25, it is checked whether an input port $PA_0$ is set to determine if a data request signal REQ·O has been received. If YES in step 25, the flow goes to step 26. Then, preparation for setting in a shift register as a serial transfer means information for signalling the operating state of the micro computer B to the micro computer A is performed in steps 26 to 28. In this example, data 0 is set in a transfer register ST0 of the shift register. The data to be transferred from the micro computer A to the micro computer B has a format as shown in FIG. 6.

After setting the data in the shift register, the register F/F and the interrupt enable are set. An output terminal $PE_0$ is set to produce a data transfer enable signal REQ·E and, at the same time, a diagnosis timer B is set. In step 29, it is checked if the timer B is time up. The time count preset in the timer B is set to be slightly longer than a data transfer speed of the data from the micro computer A. When YES in step 29, it is checked in step 30 if a diagnosis F/F is set to determine if the diagnosis flag is set. Since the diagnosis flag is set in an internal interrupt routine upon completion of data transfer, checking of the diagnosis flag allows checking if the data transfer has been performed correctly. If NO in step 30, an abnormality is detected and the flow returns to step 22 for initialization. If YES in step 30, the flow goes to step 31 wherein the diagnosis F/F is reset and the timer B is reset.

In step 32, it is checked if a flag F/START representing a copy start instruction in the interrupt routine is set.

An interrupt routine to be performed when transfer is completed after data transfer is started in step 15 in the micro computer A will now be described. Note that the interrupt routines are commenced almost simultaneously in the micro computers A and B. When the interrupt mode is established, data transferred from the micro computer B is set in the shift register (only transfer register ST0 is described here), and is set in the accumulator ACC (step 16). In steps 17 and 19, it is checked if the data of the accumulator ACC is 0 or 8, respectively. If YES (ACC=0) in step 17, it means that the micro computer B is in the standby mode. Then, a processing flag for enabling discrimination of key input at an operating section and display is controlled in step 18. However, if YES (ACC=8) in step 19, it means that the micro computer B is in a copy process. Then, in step 20, flags enabling the register F/F and the interrupt enable are reset in step 21. Thereafter, the flow returns to the main routine.

In the interrupt routine of the micro computer B, in step 45, the diagnosis F/F is set. In step 46, as in the case of the micro computer A, the content of the shift register is transferred to the accumulator ACC. If it is determined in step 47 that the content in the accumulator ACC is 13, it is determined that a copy start instruction has been received. Then, in step 48, the flag F/START is set. If it is, however, determined in step 49 that ACC=14, it is determined that a copy stop instruction has been received. Then, in step 50, the flag F/STOP is set. In step 51, the register F/F and the interrupt enable are reset. In step 52, the output port $PE_0$ is reset (signal REQ·E is reset). Thus, only after the flag F/START is set in step 32 of the micro computer B, the copy process is started.

The copy process is performed in step 34. Steps 35 to 41 relate to a means for data transfer for checking in step 42 if the flag F/STOP is received. If YES in step 42, the flow advances to step 44 of a last copy rotation process through step 43. As described above, the data transfer diagnosis is performed in steps 39 and 40. When an abnormality occurs in data transfer, the diagnosis flag is determined not to be set in step 40. Then, the flow directly advances from step 40 to step 44. In the last copy rotation in step 44, when the transfer paper sheet is being fed, the feeding of the transfer paper sheet is immediately stopped. After discharging an already supplied transfer paper sheet, the copy apparatus is stopped. Thus, the copy apparatus stops normally.

According to the present invention, when an error occurs in data transfer between micro computers, a predetermined processing is performed first, and then the micro computers are stopped safely, so that erratic operation or an accident may be prevented.

Whether the micro computers are connected in series with each other or in parallel with each other, erratic operation or an accident of the overall system may be prevented easily.

Figure 15:
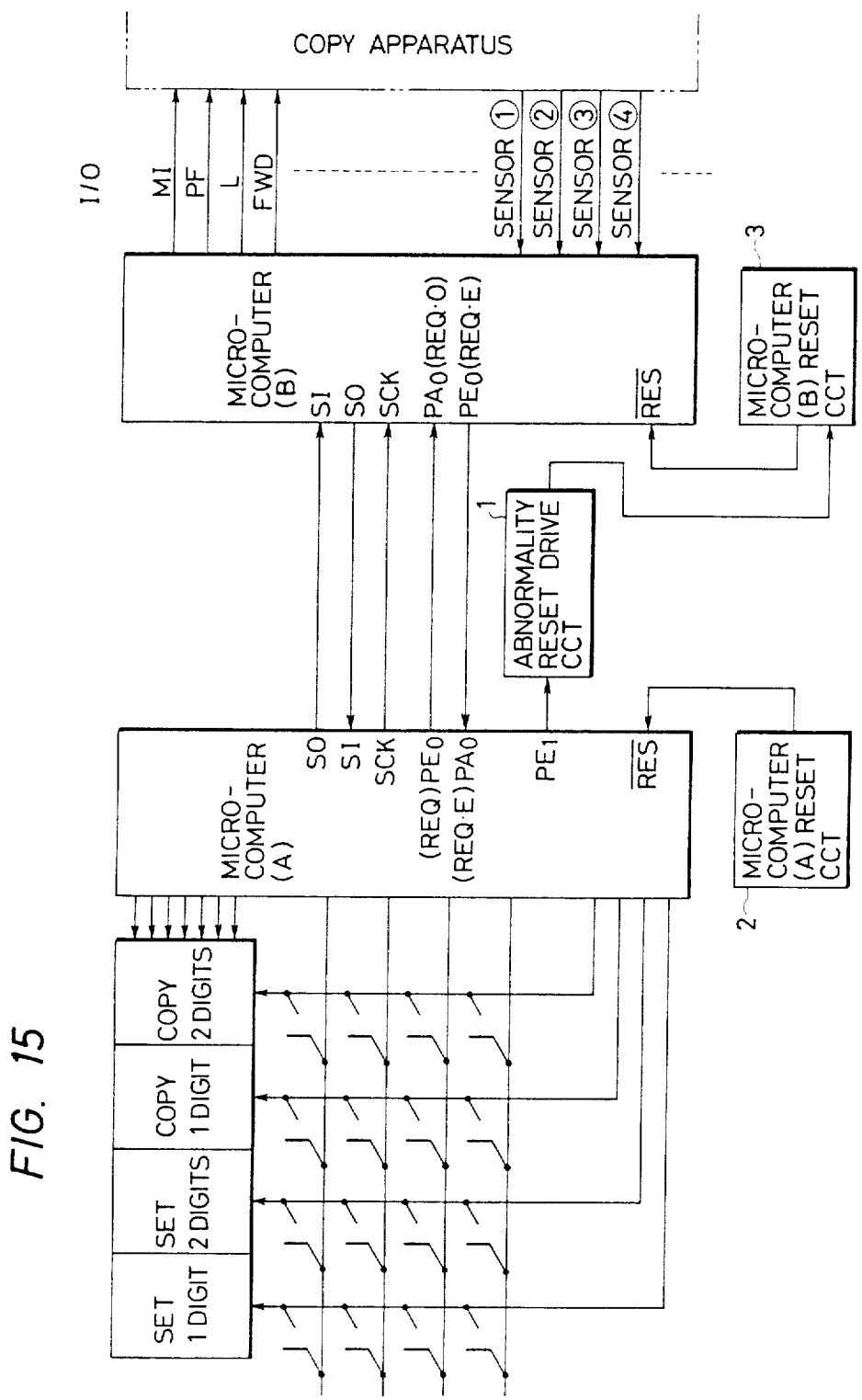
FIG. 15 is a block diagram of an image forming system having a reset means and under the control of micro computers.
Figure 16:
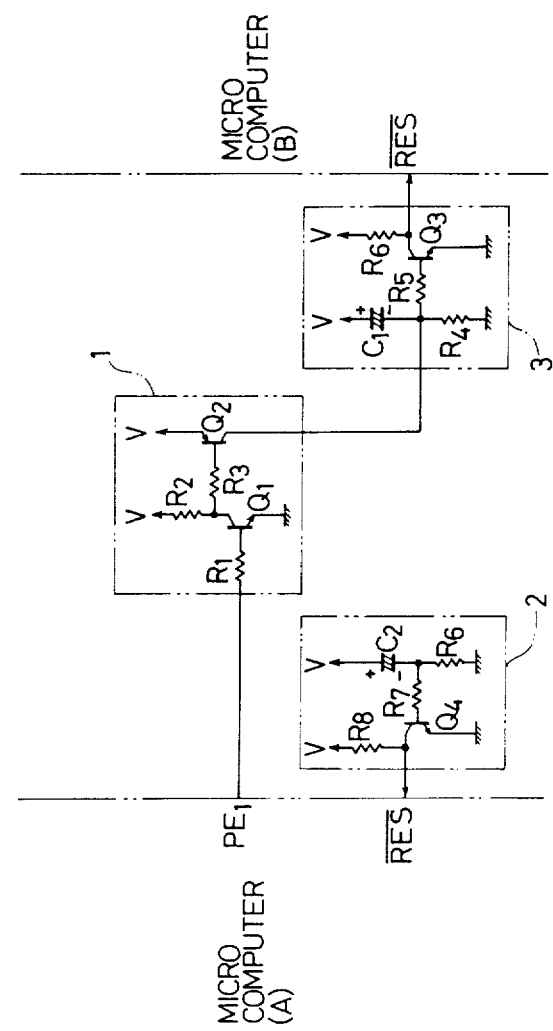
FIG. 16 is a circuit diagram of an example of the reset means.

FIG. 15 shows a block diagram of an image forming system which has a reset means and which is controlled by micro computers. FIG. 16 shows an example of the reset means. The system will be described briefly below. In each of micro computers A and B, in order to initialize counters and registers in the micro computer upon supply of power, a voltage of low level must be applied to a reset terminal for a predetermined period of time. A micro computer A reset circuit 2 is connected to the micro computer A. A micro computer B reset circuit 3 is connected to the micro computer B, and to the micro computer A through an abnormality reset drive circuit 1. The micro computers A, B are reset through capacitors $C_1$, $C_2$ and transistors $Q_3$, $Q_4$, respectively. When the master micro computer A detects an abnormality, it produces a signal of level "H" from its output port $PE_1$ so as to enable the abnormality reset drive circuit 1. Then, the circuit 1 forcibly resets the slave micro computer B through the micro computer B reset circuit 3. The reset circuits 2 and 3 of this embodiment also serve as initial reset circuits upon turning on of power. In this embodiment, the slave micro computer B is reset by the master micro computer A. However, the slave micro computer can also reset the master micro computer. Furthermore, it is also possible for each micro computer to reset itself.

Figure 17A:
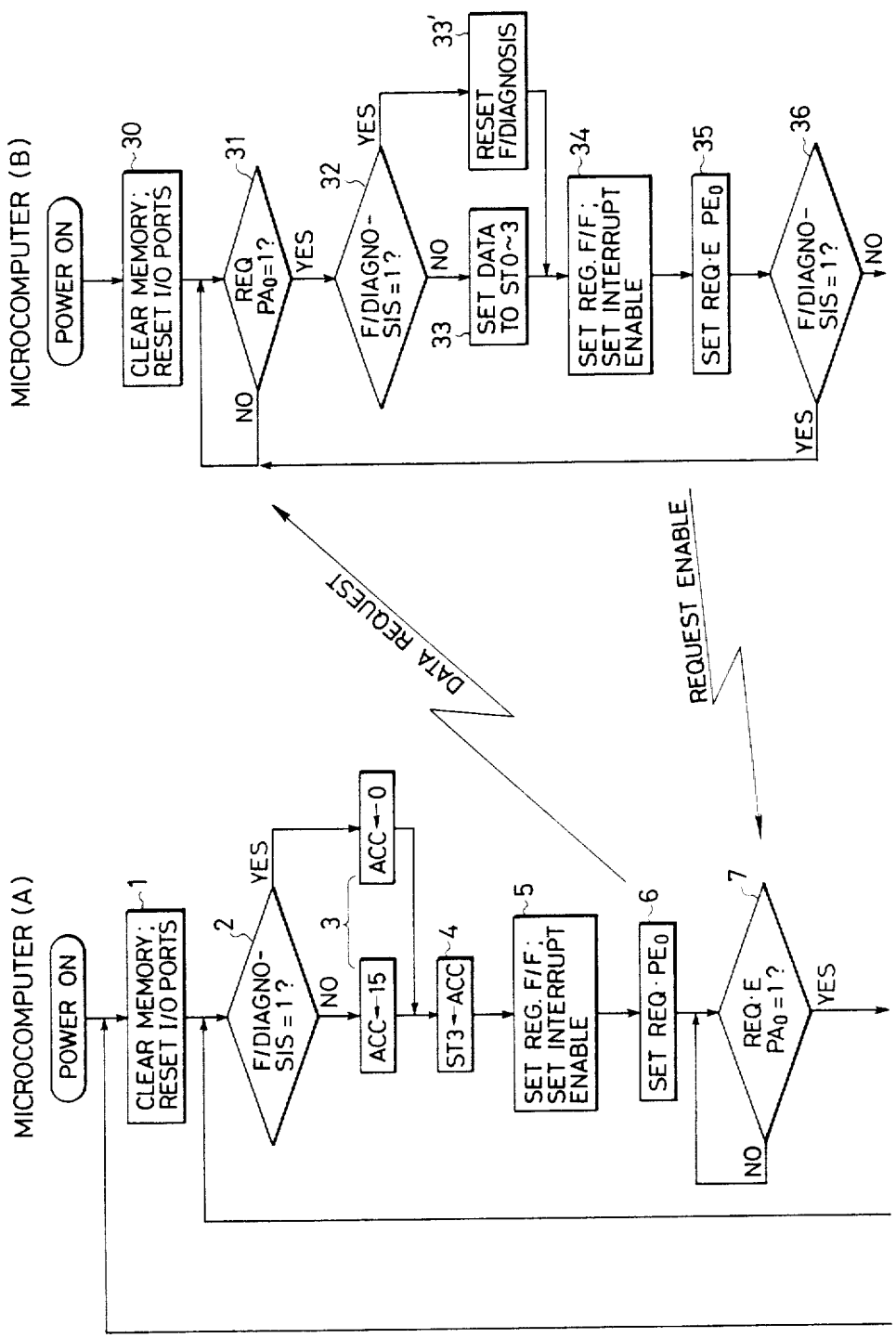
FIG. 17 composed of FIGS. 17A, 17B and 17C is a flowchart showing a data transfer operation and a self-diagnosis operation of the two micro computers A and B.
Figure 17B:
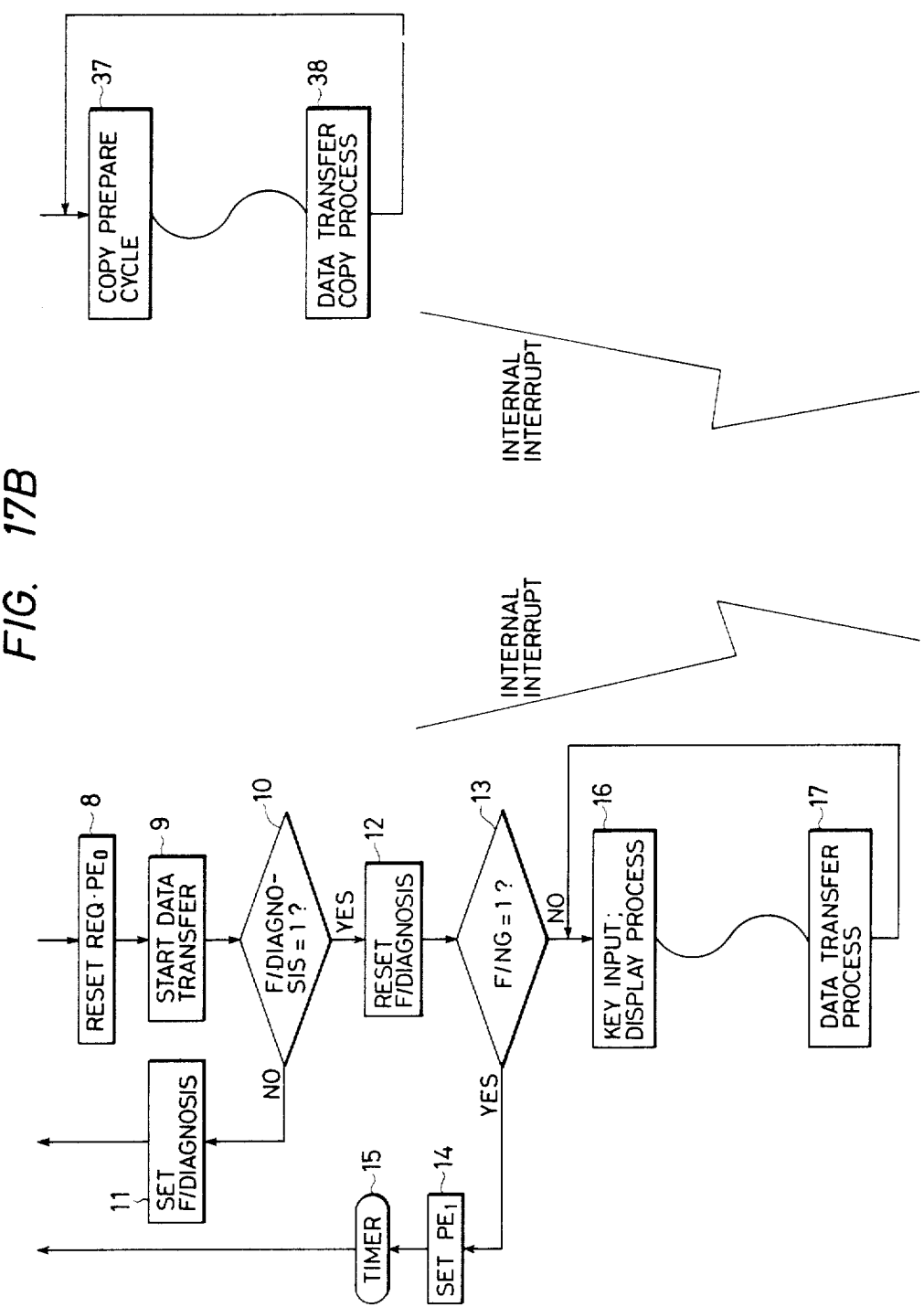

FIG. 17 shows a flowchart of a data transfer operation and a self diagnosis operation of two micro computers A and B having reset means.

A description will first be made with refererence to the micro computer A. After power on, in step 1, a data memory, I/O ports and the like are reset (cleared). In step 2, it is discriminated if a flag F/DIAGNOSIS is set. In the initial state after power on, the flag F/DIAGNOSIS is not set. Therefore, NO is obtained in step 2, and in step 3 data 15 is set in an accumulator ACC so as to set data for initial data transfer diagnosis in a transfer register ST3 of a shift register as a serial transfer means. In step 4, the data 15 is then set in the transfer register ST3. In step 5, a register F/F for enabling transfer of the shift register and an interrupt enable for an interrupt F/F for generating an internal interrupt are set. In step 6, an output port $PE_0$ is set to supply a signal REQ·O to the micro computer B so as to signal to the micro computer B that the micro computer A desires to transfer data thereto. In step 7, a signal REQ·E from the micro computer B is awaited. When the signal REQ·E is obtained in step 7, the flow goes to step 8 wherein the output port $PE_0$ is reset. In step 9, data transfer is started. In this manner, after power is turned on, the register ST3 transfers data 15 and other registers ST0 to ST2 of the shift register transfer data 0 in the data diagnosis mode from the micro computer A to the micro computer B.

In the second data transfer, the micro computer A discriminates if the data is normal by checking if the data received from the register ST3 is 15 and the data received from the remaining registers ST0 to ST2 is 0. This will be described below. When data transfer is started in step 9 and is completed, an internal interrupt is generated. In the interrupt routine, it is checked in step 18 if the flag F/DIAGNOSIS is set. Since NO in step 18, the initial data of the micro computer B is discriminated in step 28. In step 29, a register F/F and an interrupt enable are reset, and the flow returns to the main routine. In the interrupt routine of the micro computer A, if the flag F/DIAGNOSIS is not set, data diagnosis is not performed. Data diagnosis is performed only after the following condition is satisfied. Since the flag F/DIAGNOSIS is reset and NO is obtained in step 10 of the micro computer A, the flow advances to step 11 wherein the flag F/DIAGNOSIS is set. Then, the flow returns to step 2 wherein data transfer is performed. This is because the micro computer A performs data diagnosis by confirming if the initially transferred data from the micro computer A has been correctly returned from the micro computer B. In step 9, the second data transfer is performed. When a second interrupt is generated, it is determined in step 18 this time that the flag F/DIAGNOSIS is set. Then, the micro computer A discriminates in steps 19 to 26 if the data initially transferred from the micro computer A has been correctly returned from the micro computer B. If the data has been correctly returned, the flow goes to step 29 and data transfer is continued. If the data is not correctly returned, the micro computer A detects a data transfer abnormality. The flow goes to step 27 wherein a flag F/NG is set. When the flag F/NG is set, YES is obtained in step 13 of the main routine. Thus, the flow goes from step 13 to step 14 wherein the output port $PE_1$ is set. When the output port $PE_1$ is set, the micro computer B is forcibly reset and the program is initialized as described with reference to FIGS. 15 and 16. This reset time is controlled by a timer means in step 15. After a predetermined period of time preset in the timer elapses, the micro computer A starts step 1 and the program is started from the beginning. In this manner, when there is some data transfer abnormality, the master and slave micro computers are started from the beginning and erastic operation of the overall system is prevented.

A description will now be made with reference to the micro computer B. After power on, a data memory (RAM) and I/O ports are reset in step 30. It is then checked in step 31 whether an input port $PA_0$ is set to check if a data transfer request signal REQ·O has been received from the micro computer A. If YES in step 31, the flow goes to step 32 wherein it is checked if a flag F/DIAGNOSIS is set. Since the flag F/DIAGNOSIS is not set in the initial state, the flow goes to step 33 wherein predetermined data is set in transfer registers ST0 to ST3 of a shift register as a serial transfer means. In step 34, a register F/F for enabling data transfer and an interrupt enable are set. In step 35, in order to signal to the micro computer A that the micro computer B is ready to accept data, the micro computer sets an output port $PE_0$ so as to generate a signal REQ·E. When the output port $PE_0$ is set, data transfer from the micro computer A is started. When data transfer is completed, an internal interrupt is generated. Then, in step 40 of an interrupt routine, data in the transfer register ST3 is transferred to an accumulator ACC. It is then discriminated in step 41 if the transferred data is in the diagnosis mode by checking if the content of the accumulator is data 15. If the content is data 15, it indicates the diagnosis mode. Then, the flow goes to step 45 wherein the flag F/DIAGNOSIS is set. The flow then advances to step 43 wherein a register F/F and an interrupt enable are reset. In step 44, an output port $PE_0$ is reset so as to turn off the signal REQ·E. On the other hand, if NO in step 41, the flow goes to step 42 wherein general data discrimination processing is performed. In the micro computer B, during the first data transfer, the diagnosis mode from the micro computer A is discriminated and the flag F/DIAGNOSIS is set in the interrupt routine. Therefore, in step 36 of the micro computer B, in order to wait for a second data transfer request, the flow goes to step 31. When it is determined in step 31 that there is a second data transfer request signal REQ·O, the flag F/DIAGNOSIS is checked in step 31. The content of the registers ST0 to ST3 of the shift register is not processed. After the flag F/DIAGNOSIS is reset in step 33', the flow goes to step 34 for preparing for data transfer so as to perform the second data transfer. If the flag F/DIAGNOSIS is determined to be set in step 32, the data transferred from the micro computer A is directly transferred to the micro computer B. Thus, self diagnosis and diagnosis processing of the data can be performed in this manner.

According to the embodiment described above, diagnosis of data transfer is performed in the initial period after power of the micro computers A and B is turned on. However, it is generally possible to perform data transfer diagnosis at predetermined intervals during actual data transfer. The above description is made with reference to the case of diagnosis. However, general data transfer such as start or stop of the copy operation or other data transfer necessary for the copy process can be performed by the data transfer means as described above and the data formats as shown in FIGS. 5 and 6.

According to the present invention, when a data transfer abnormality is generated between peripherals, micro computers controlling the peripherals are reset, so that erratic operation or an accident of the overall system can be prevented.

Even if a system incorporates a number of micro computers, immediately after an abnormality is caused, the micro computers are reset, so that erratic operation and an accident of the overall system can be prevented.

Figure 18:
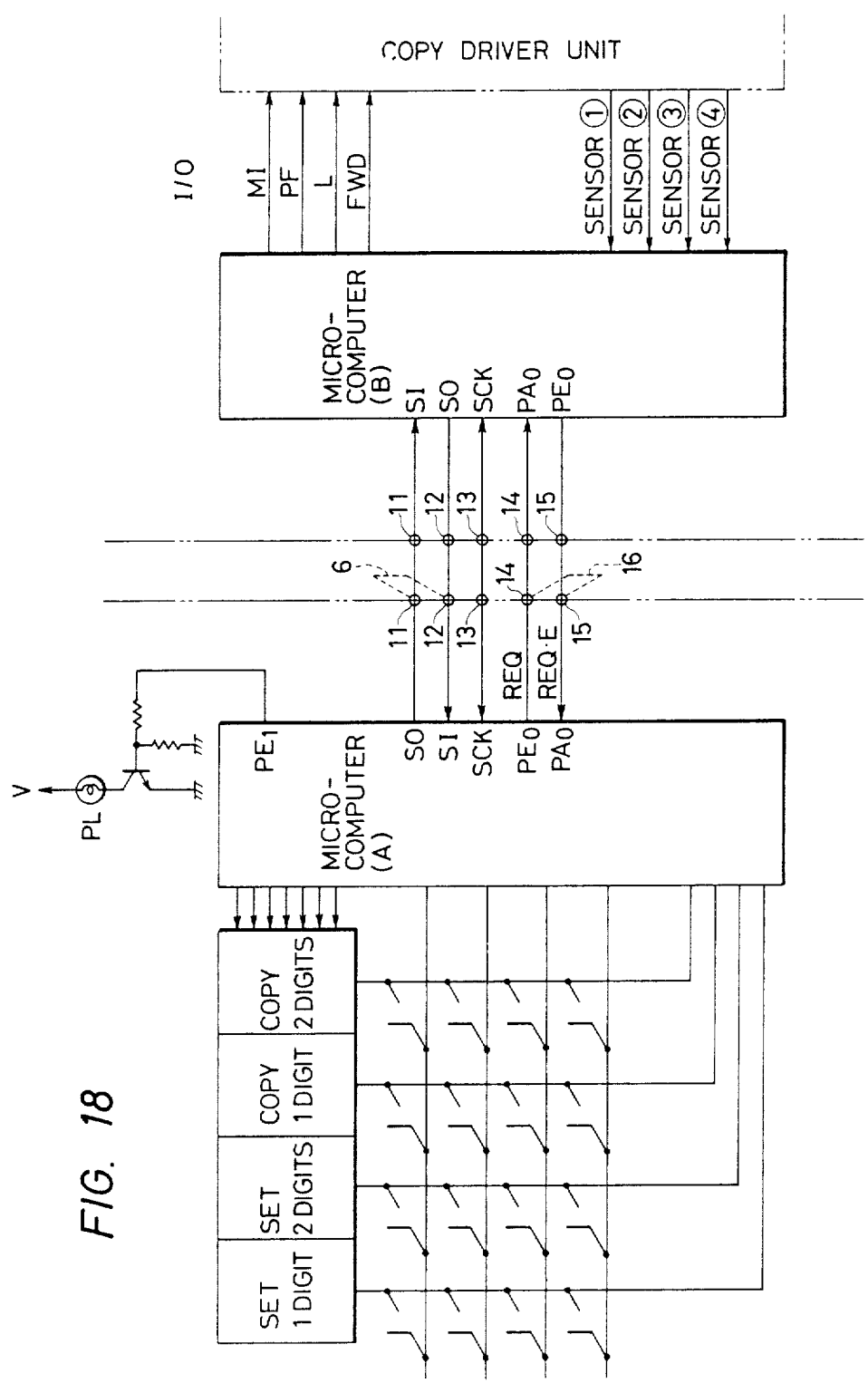
FIG. 18 is a block diagram of an image forming system having short bars and under the control of micro computers.
Figure 19:
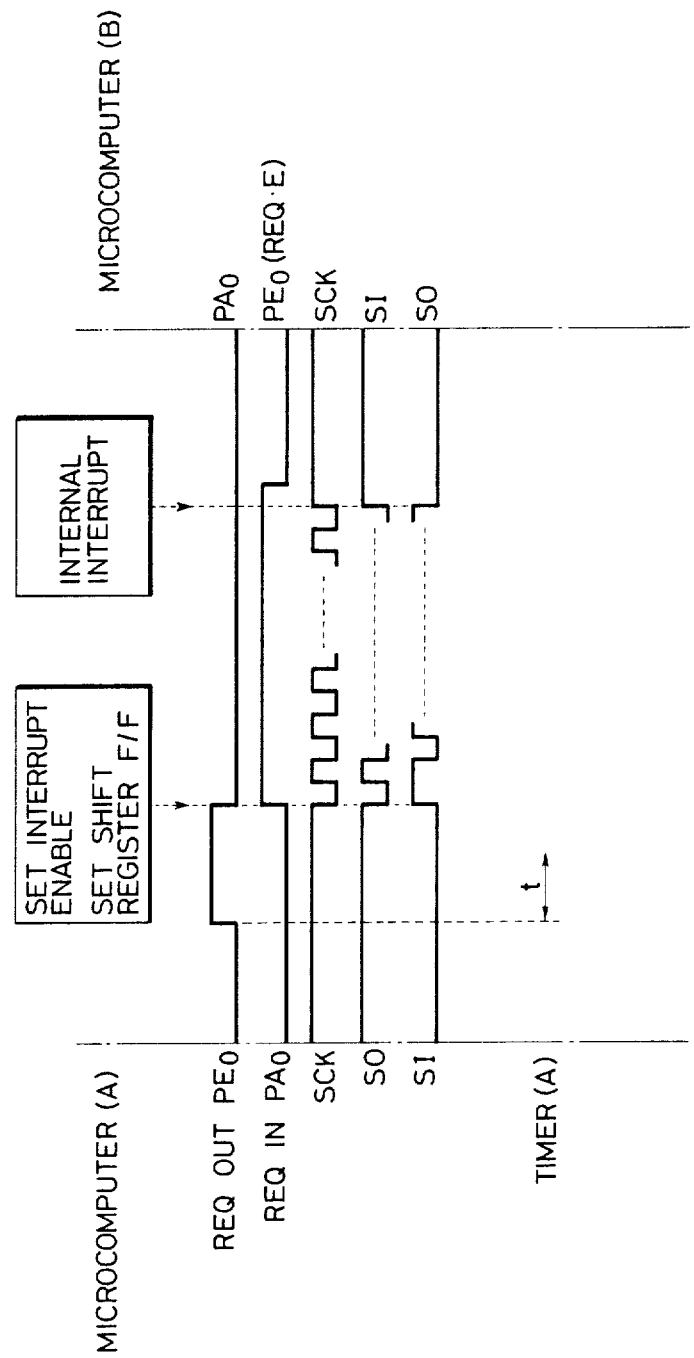
FIG. 19 shows timing charts of serial transfer when short bars and timers are used.
Figure 20B:
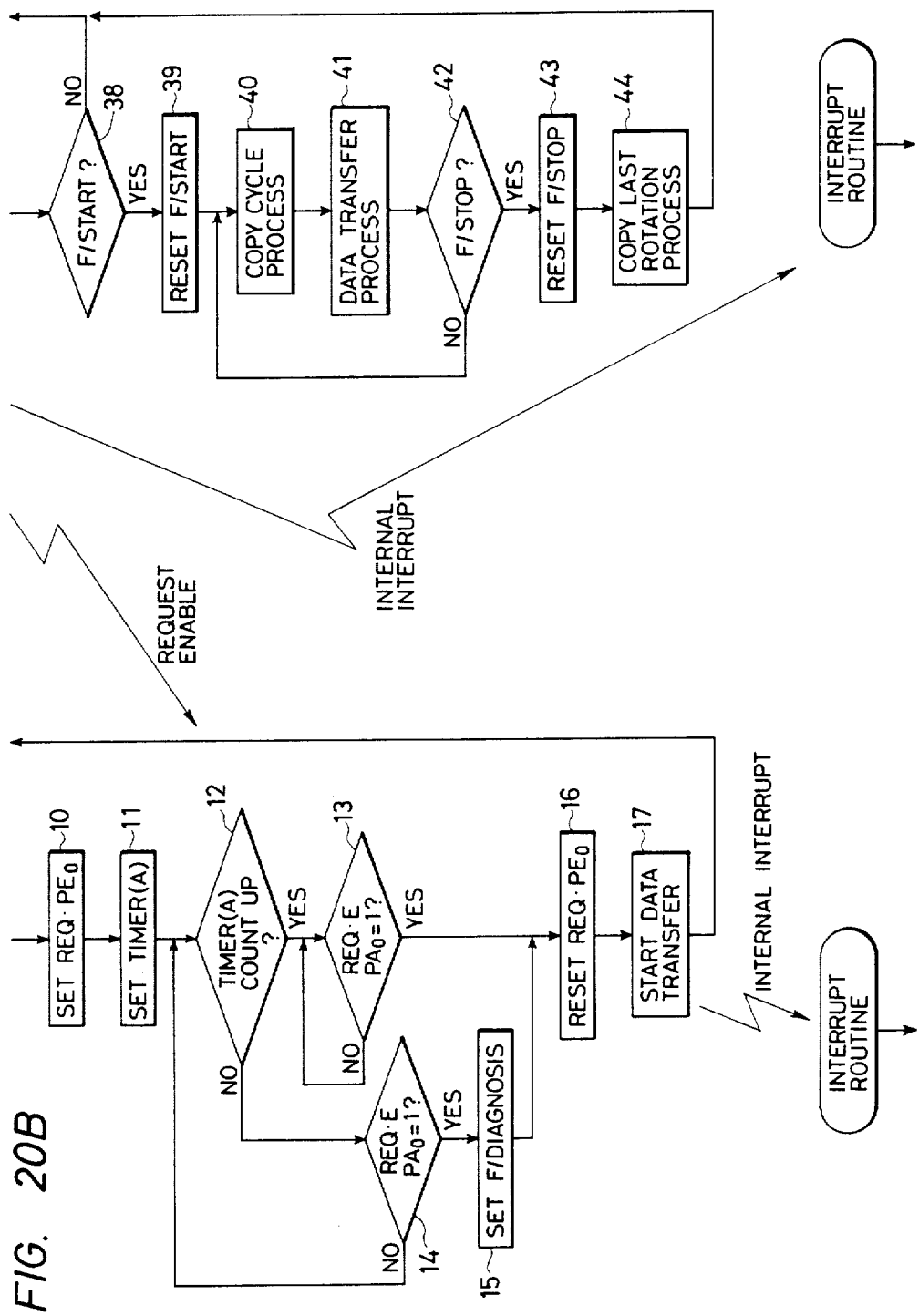
FIG. 20 composed of FIGS. 20A, 20B and 20C is a control flowchart of an image forming system having short bars.
Figure 20C:
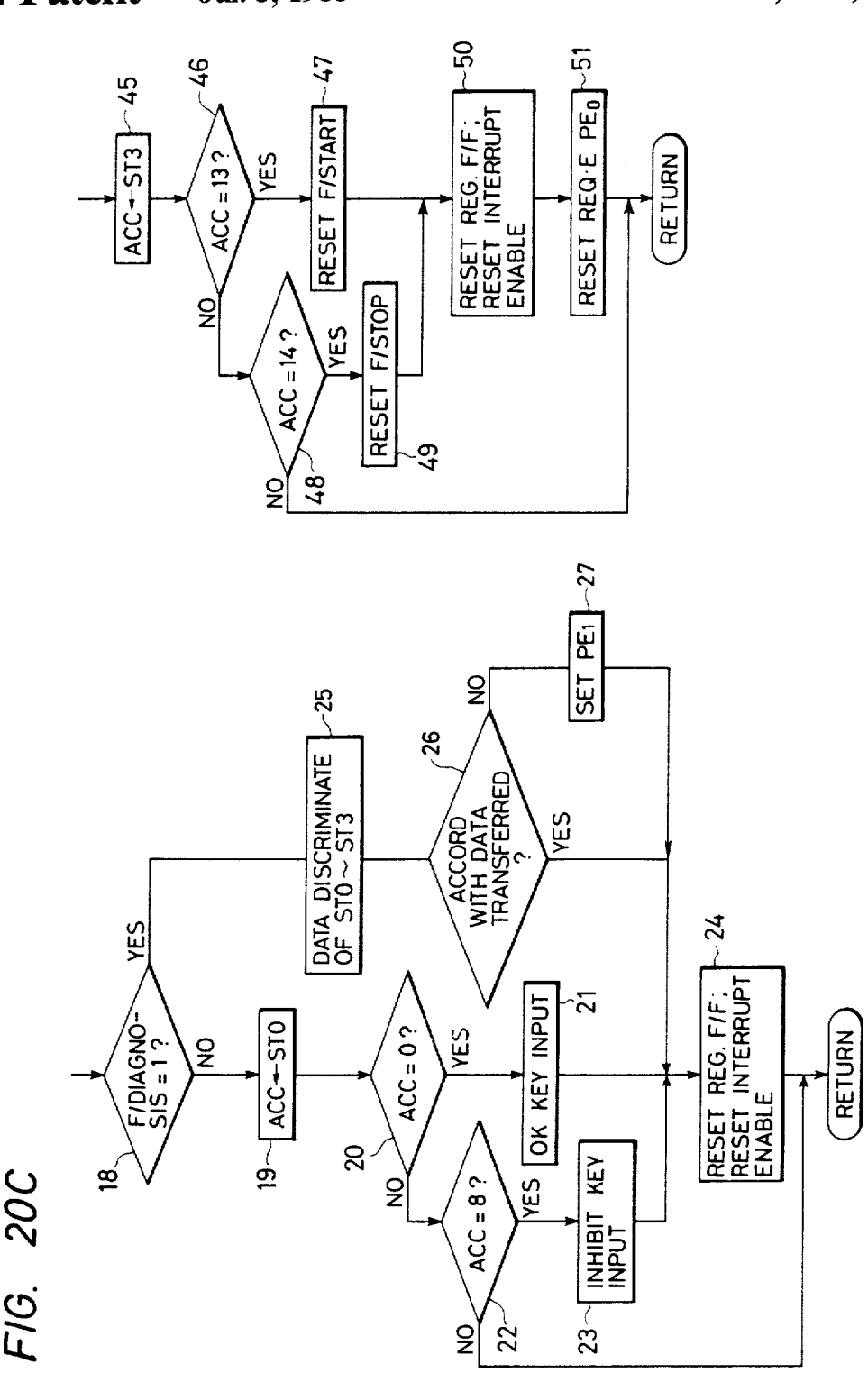

FIG. 18 is a block diagram of an image forming system which has short bars and which is controlled by micro computers. Short bars 16 are connected to connectors 11, 12, 14 and 15. A lamp PL indicates an abnormality when an abnormality is detected by data diagnosis. FIG. 19 shows timing charts of serial transfer when short bars and timers are used as in the case of FIGS. 4 and 13. FIG. 20 is a control flowchart of the image forming system having short bars.

A description will first be made with respect to a micro computer A. After power on, in step 1, a data memory, I/O ports and the like are reset (cleared). After performing discrimination of key input of an operating section (not shown) and display process in step 2, it is discriminated in step 3 if a register F/F is set. In step 4, it is checked if a copy button is depressed in step 2. If YES in step 4, the flow goes to step 5 wherein data 13 representing a copy start instruction is set in an accumulator ACC so as to set it in a transfer register ST3 of a shift register as a serial transfer means as data to be supplied to a sequence control micro computer B, as shown in FIG. 5. However, if a stop key is depressed in step 2, NO is obtained in step 4 and YES is obtained in step 6. In this case, data 14 is set in the accumulator ACC. After the data in the accumulator ACC is set in the transfer register ST3 in step 8, a register F/F for enabling the shift register and an interrupt enable for setting an interrupt F/F are set in step 9. In step 10, an output port $PE_0$ is set so as to supply a data transfer request signal REQ·O to the micro computer B.

In step 11, a diagnosis timer A is set. When a signal REQ·O is supplied from the micro computer A to the micro computer B, it generally takes a predetermined period of time for the micro computer B to return a data transfer enable signal REQ·E to the micro computer A. Accordingly, the timer A sets therein a count which corresponds to a time slightly shorter than this predetermined period of time. This predetermined period of time corresponds to a period of time required for the micro computer B to set the data in its shift register after it receives a signal REQ·O from the micro computer A. The count corresponding to the time slightly shorter than the predetermined period of time is set in the timer A so as to allow the micro computer A to discriminate the diagnosis mode if it detects a signal REQ·E within the timer time. When the short bars are connected as shown in FIG. 18, a signal REQ·O from the micro computer A is directly connected for detection of a signal REQ·E from the micro computer B. A serial output port SO of the micro computer is connected to a serial input port SI of the micro computer B. This means that simultaneously as the micro computer A produces a signal REQ·O, the micro computer A detects a signal REQ·E. Thus, data diagnosis can be commenced. This operation is performed in steps 12 and 14. In the data diagnosis mode, a diagnosis flag F/DIAGNOSIS is set in step 15. However, if not in the diagnosis mode, the flow goes to step 13. In step 13, it is checked if an input port $PA_0$ is set so as to determine if a signal REQ·E is received. When YES in step 13, an output port $PE_0$ is reset in step 16. In step 17, data transfer is started.

A description will now be made with respect to the micro computer B. After power on, a data memory and I/O ports are reset in step 30. After the copy preparation cycle is checked in step 31, it is checked in step 32 if a register F/F for confirming a shift register operation is set. In step 33, it is checked if an input port $PA_0$ is set so as to determine if a signal REQ·O is received from the micro computer A. If YES in step 33, the flow goes to step 34. A preparation for setting data for signalling the operating state of the micro computer B to the micro computer A in a shift register having transfer registers ST0 to ST3 is performed (steps 34 to 36). In step 34, data 0 is set in a standby transfer register ST0 of the micro computer B.

The data supplied from the micro computer B to the micro computer A has a format as shown in FIG. 6. After the data is set in the shift register, a register F/F and an interrupt enable are set. Then, an output port $PE_0$ is set in step 37 so as to signal to the micro computer A that the micro computer B is in the standby mode for data transfer In step 38, it is discriminated if a flag F/START is set.

An interrupt routine which is generated upon completing a data transfer from the micro computer A will be described. Internal interrupts are generated almost simultaneously in the micro computers A and B.

Referring to the interrupt routine of the micro computer A shown in FIG. 20, after an internal interrupt is generated, in step 18, it is discriminated if a flag F/DIAGNOSIS is set. If the flag F/DIAGNOSIS was set in step 5 of the main routine, the flow goes from step 18 to step 25. In step 25, the data in the transfer registers ST0 to ST3 is discriminated. In step 26, it is discriminated if the data received coincides with the previous data transferred from the micro computer A. When the short bars are used, if the connection of the serial output port SO and the serial input port SI is correct, the same data is necessarily set in the register. However, if there is some problem such as a defective substrate pattern, a defective connector connection, or a lead wire disconnection, the same data may not be transferred. Accordingly, if NO in step 26, the flow goes to step 27 wherein an output port $PE_1$ is set so as to supply a drive signal to the lamp PL. In general, the data from the micro computer B is set in the shift register and is transferred to the accumulator ACC in step 19 (will be referred with respect to the transfer register ST0). In steps 20 and 22, the content of the accumulator ACC is discriminated. If ACC=0 in step 20, it means that the micro computer B is in the standby mode. Then, in step 21, a process flag for enabling key input from an operating section (not shown) and display is set. If ACC=8 in step 22, this indicates that the micro computer B is in the copy process. Therefore, key input is inhibited in step 23. In step 24, a register F/F and an interrupt enable are reset.

In an interrupt routine of the micro computer B, the content of a shift register having transfer registers ST0 to ST3 (ST3 in this case) is transferred to an accumulator ACC as in the case of the micro computer A. If it is determined in step 46 that ACC=13, it means that a copy start instruction is generated. Then, in step 47, a flag F/START is set. If ACC=14 in step 48, it means that a copy stop instruction is generated. In this case, a flag F/STOP is set in step 49. After a register F/F and an interrupt enable are reset in step 50, an output port $PE_0$ is reset so as to reset a signal REQ·E in step 51. When the flag F/START is set, the copy process is performed.

The copy cycle process is performed in step 40 of the main routine. In step 41, the data transfer process is performed. In step 42, it is discriminated if the flag F/STOP is set. If YES in step 42, the flow goes to step 44 wherein the copy last rotation process is performed. In this embodiment, a description is made with reference to a case of data diagnosis and copy start/stop. However, the present invention is not limited to this.

According to the present invention, diagnosis during data transfer between micro computers can be performed by means of timers or short bars. Any abnormality detected is displayed. Accordingly, data transfer among a plurality of micro computers may be facilitated.

The present invention is similarly effective when an abnormality is caused in a system wherein a plurality of micro computers are formed on separate boards and data transfer means are connected through connectors and lead wires. If a cause of erratic operation cannot be determined as being one of a defective pattern, a defective connector connection, a lead wire disconnection, a mechanical noise and the like, it may be easily determined by connecting the short bars at predetermined positions.

What is claimed is:

1. An image forming system comprising:
   a plurality of operable means for image formation including key means for an instruction and display device;
   first computer means provided with a data memory, a processor, and a memory storing a program for operation control of some of said opeerable means;
   second computer means provided with a data memory, a processor, and a memory storing a program for opeeration control of some other of said operable means;
   a data line coupled between said first and second computer means and provided with switch means for deetecting an abnormality relating to a transfer of data between said two computer means; and
   means adapted for transferring, from one of said computer means to the other, the data necessary for operation control by said other computer means, wherein said transferred data is in a form of serial pulses, and wherein said serial pulses are transferred through said data line coupled between said first and second computer means.

2. A system according to claim 1, wherein at substantially the same time as a turning ON of said switch means, said first and second computer means are able to recognize that said system is in a detection mode.

3. A system according to claim 2, wherein information indicating whether said switch means is ON or OFF is transferred through a line which is separate from the line for transferring image formation data.

4. A system according to claim 1, further comprising an accumulator, wherein upon turning ON of said switch means, said first and second computer means set a predetermined detection data in said accumulator.

5. A system according to claim 4, wherein said detection data is transferred to the other computer means using the same line through which data relating to said image formation is transferred.

6. A system according to claim 5, wherein a line is provided between said first and second computer means for abnormality information transfer when said transferred detection data is not a predetermined one.

7. An image forming system comprising:
   a plurality of operable means for image formation;
   a first computer means provided with a memory storing a program for control of at least one of said operable means;
   second computer means provided with a memory storing a program for control of at least one other of said operable means;
   means for transferring to said first computer means from said second computer means the data necessary for operation control by said first computer means in a form of serial pulses, wherein said transferring means has a serial pulse data line and a pre-communication line independent of said serial pulse data line, and said first and second computer means perform a transference of said serial pulses through said data line therebetween after transmitting and receiving predetermined signals through said pre-communication line for data transfer preparation; and
   timer means for detecting an abnormality of said pre-communication data through said pre-communication line.

8. A system according to claim 7, wherein said timer means is provided for determining whether or not one of said computer means which requested a transference through said pre-communication line has received data, within a predetermined time, indicating that the transference is ready.

9. A system according to claim 8, further comprising second timer means for starting, upon transferring said data indicating that the transference is ready, in order to determine whether said computer means which requested a transference has transferred said data necessary for operation control within a predetermined time.

10. A system according to claim 9, wherein after a timing period of said second timer means is completed, said second computer means checks a test flag set by an internal interruption.

11. An image formation system comprising:
plural operable means for image reproduction, which includes a display means and a key means for instruction;
first computer means provided with a memory storing a program for operation control of some of said operable means;
second computer means provided with a memory storing a program for operation control of some other of said operable means;
third computer means provided with a memory storing a program for operation control of still some other of said operable means; and
means adapted for transferring data necessary for the operation control from said first computer means to the other computer means in series wherein said first computer transfers data indicating an address to which a transference is to be performed prior to the transference of the data necessary for the operation control.

12. A system according to claim 11, wherein said second computer means receives the data from said first computer means and if the address is said third computer means, the data necessary for the operation is not received by said second computer means.

13. An image forming system comprising:
plural operable means for image formation which includes key means for instruction and display means;
first computer means provided with a data memory, a processor, and a memory storing a program for operation control of some of said operable means;
second computer means provided with a data memory, a processor and a memory storing a program for operation control of some other of said operable means;
a data line coupled between said first and second computer means; and
means adapted for transferring, from one of said computer means to the other, the data necessary for operation control by said other computer means, wherein said transferred data is in a form of serial pulses, and wherein said serial pulses are transferred through said data line coupled between said first and second computer means;
wherein said other computer means checks the presence or absence of an abnormality of said data transference and in the case of the presence of an abnormality controls functions for abnormality recovery after said operable means performs predetermined functions thereof.

14. A system according to claim 13, wherein said operable means performs a copy function.

15. A system according to claim 13, wherein said abnormality check is performed after a power ON operation or in a predetermined period during normal transferences.

16. An image forming system comprising:
plural image forming operation means for image formation, wherein each of said means includes a display means and a key means for instruction;
first computer means provided with a memory storing a program for control of at least one of said operation means;
second computer means provided with a memory storing a program for control of at least one other of said operation means; and
means for transferring to said first computer means from said second computer means the data necessary for operation control by said first computer means in a form of serial pulses, said transferring means having a short bar for forming a short circuit in the data line from said first computer means to said second computer means and in the line from said second computer means to said first computer means;
wherein said first computer means includes timer means, and, by starting said timer means upon the data transference to said second computer means, checks whether or not the data transferred to said second computer means has been transferred back through said short bar within a predetermined time, thereby determining that said system is in an abnormality detection mode.

17. A system according to claim 16, wherein said data transferred from said first computer means to said second computer means is pre-communication data for transferring data relating to image formation.

18. An image processing system comprising:
a plurality of operable means for image processing;
first processing means provided with a data memory, a processor, and a memory storing a program for operation control of some of said operable means;
second processing means provided with a data memory, a processor, and a memory storing a program for operation control of some other of said operable means, wherein data is transferred between said first and second processing means, and wherein said first processing means is capable of detecting a data transfer abnormality; and
reset means for resetting said second processing means, wherein, upon detection of a said data transfer abnormality by said first processing means, said first processing means resets itself by a preset program and enables said reset means to reset said second processing means.

19. A system according to claim 18, wherein after reset, said first processing means restarts its program through software.

20. A system according to claim 18, wherein after enabling said reset means to reset said second processing means through hardware, said first processing means resets itself through software.

21. A system according to claim 18, wherein said first processing means resets itself after a predetermined time duration from the enabling of said reset means to reset said second processing means.

22. A system according to claim 18, wherein said first and second processing means are simultaneously reset and simultaneously restarted.

23. A system according to claim 18, wherein serial transmission is performed between said first and second processing means.

24. In an image forming system, the improvement comprising:

transfer means for transferring control data for image forming, the control data being in the form of serial pulses;

control means, including first and second computer means, for controlling an image forming operation, said first computer means being capable of detecting an abnormality in the control data to be transferred by said transfer means, wherein said transfer means is disposed between said first and second computer means and wherein one of said first and second computer means sequence-controls elements in said image forming system with relation to the image forming operation, and the other of said first and second computer means manages data input related to the image forming operation; and reset means for resetting said second computer means when the abnormality in the control data is detected, wherein said reset means resets said second computer means in response to a data transfer abnormality detected by said first computer means.

25. A system according to claim 24, wherein said reset means includes a reset circuit having transistors and a drive circuit for driving the reset circuit.

26. A system according to claim 24, wherein said first computer means detects the abnormality by determining with the use of a diagnosis flag, whether the control data which has been transfered from the first computer means side is correctly transferred back from the second computer means side.

27. A system according to claim 24, wherein after reset by said reset means, said second computer means restarts its program.

28. A system according to claim 24, wherein said reset means also serves to reset said first and second computers upon power on of said system.

29. A system according to claim 24, wherein serial transmission is performed between said first and second computer means.

* * * * *

UNITED STATES PATENT AND TRADEMARK OFFICE
CERTIFICATE OF CORRECTION

PATENT NO. : 4,755,996

DATED : July 5, 1988

INVENTOR(S) : SHUNICHI MASUDA

It is certified that error appears in the above-identified patent and that said Letters Patent is hereby corrected as shown below:

AT [30] IN FOREIGN APPLICATION PRIORITY DATA

The dates for the third through sixth priority doumnets should read August 27, September 3, September 3 and September 3, respectively.

IN THE DRAWINGS

Sheet 12, Figure 10, "SPECITY" should read --SPECIFY--.

COLUMN 3

Line 29, "PRFERRED" should read --PREFERRED--.

COLUMN 5

Line 25, "descrimination" should read --discrimination--.

COLUMN 9

Line 20, "YES is" should read --YES in--.

COLUMN 12

Line 43, "erastic" should read --erratic--.

COLUMN 16

Line 3, "opeerable" should read --operable--.
Line 6, "opeeration" should read --operation--.
Line 10, "deetecting" should read --detecting--.

UNITED STATES PATENT AND TRADEMARK OFFICE
CERTIFICATE OF CORRECTION

PATENT NO. : 4,755,996

DATED : July 5, 1988

INVENTOR(S) : SHUNICHI MASUDA

It is certified that error appears in the above-identified patent and that said Letters Patent is hereby corrected as shown below:

COLUMN 17

Line 27, "first computer" should read --first computer means--.

COLUMN 20

Line 9, "transfered" should read --transferred--.
    Line 17, "computers" should read --computer means--.

Signed and Sealed this

Eighteenth Day of April, 1989

Attest:

DONALD J. QUIGG

*Attesting Officer*    *Commissioner of Patents and Trademarks*